Jan. 26, 1954 R. S. WALLACH ET AL 2,667,304
CALCULATING MACHINE
Filed May 27, 1948 20 Sheets-Sheet 1

INVENTORS
Torkel E Torkelson and
Robert S. Wallach

BY Duell and Kane
ATTORNEYS

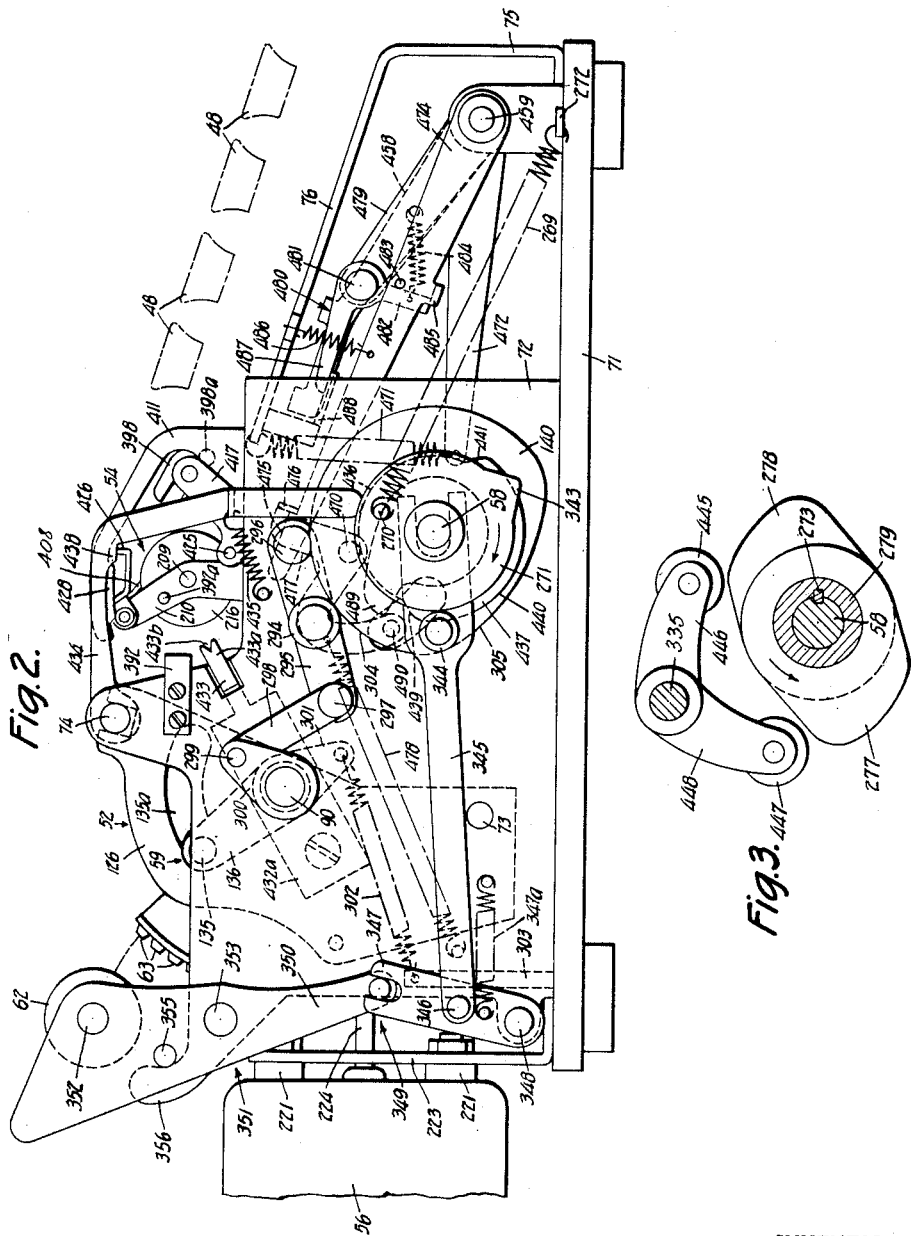

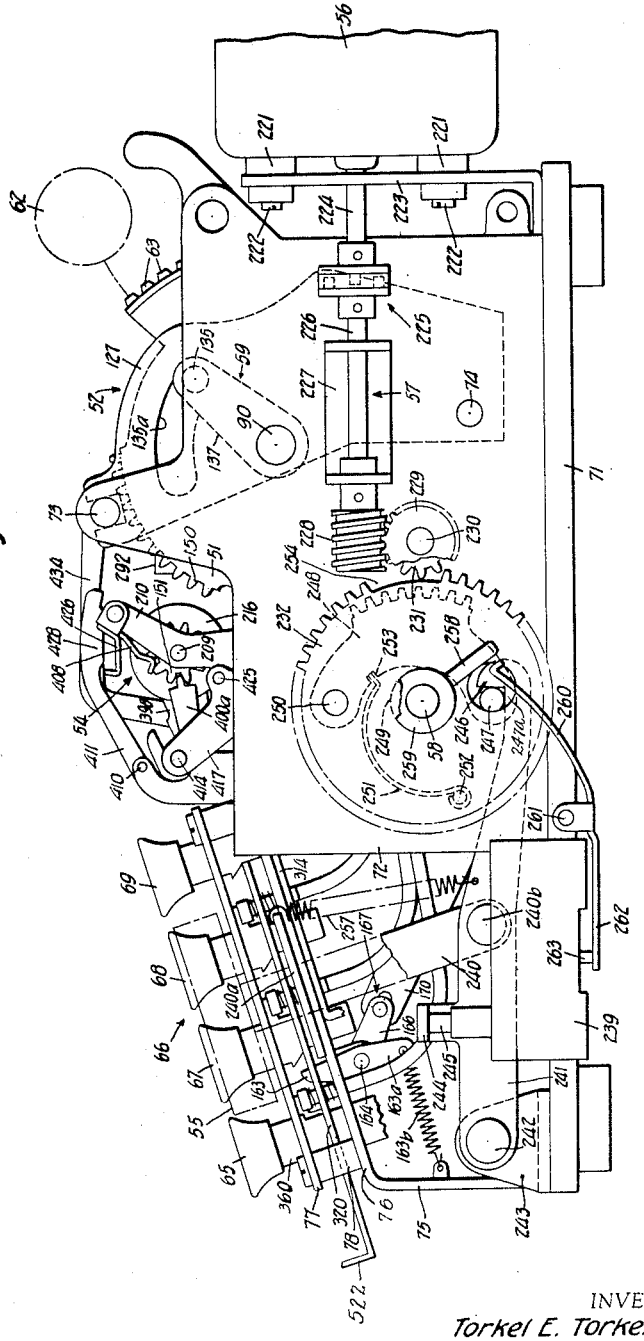

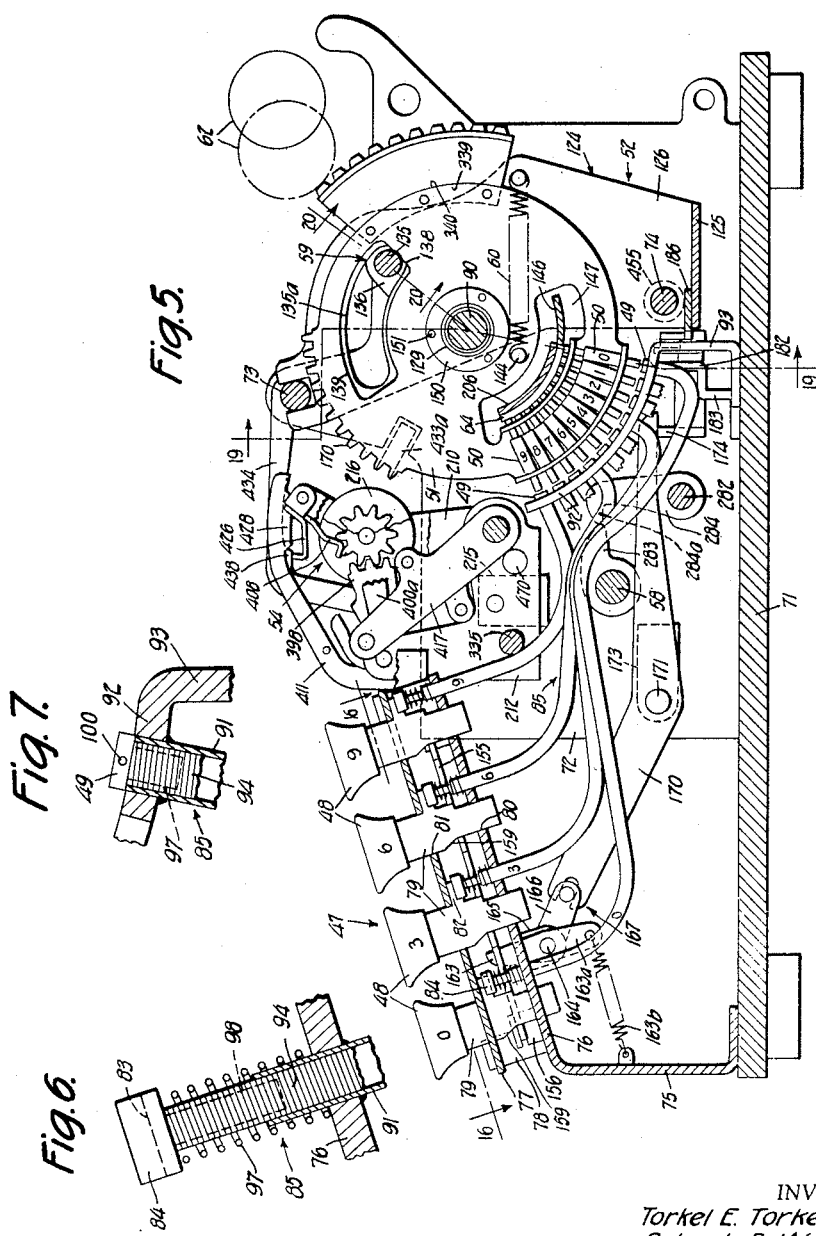

Jan. 26, 1954    R. S. WALLACH ET AL    2,667,304
CALCULATING MACHINE
Filed May 27, 1948    20 Sheets-Sheet 5

INVENTORS
Torkel E. Torkelson and
Robert S. Wallach

BY Duell and Kane
ATTORNEYS

Jan. 26, 1954   R. S. WALLACH ET AL   2,667,304
CALCULATING MACHINE
Filed May 27, 1948    20 Sheets-Sheet 6
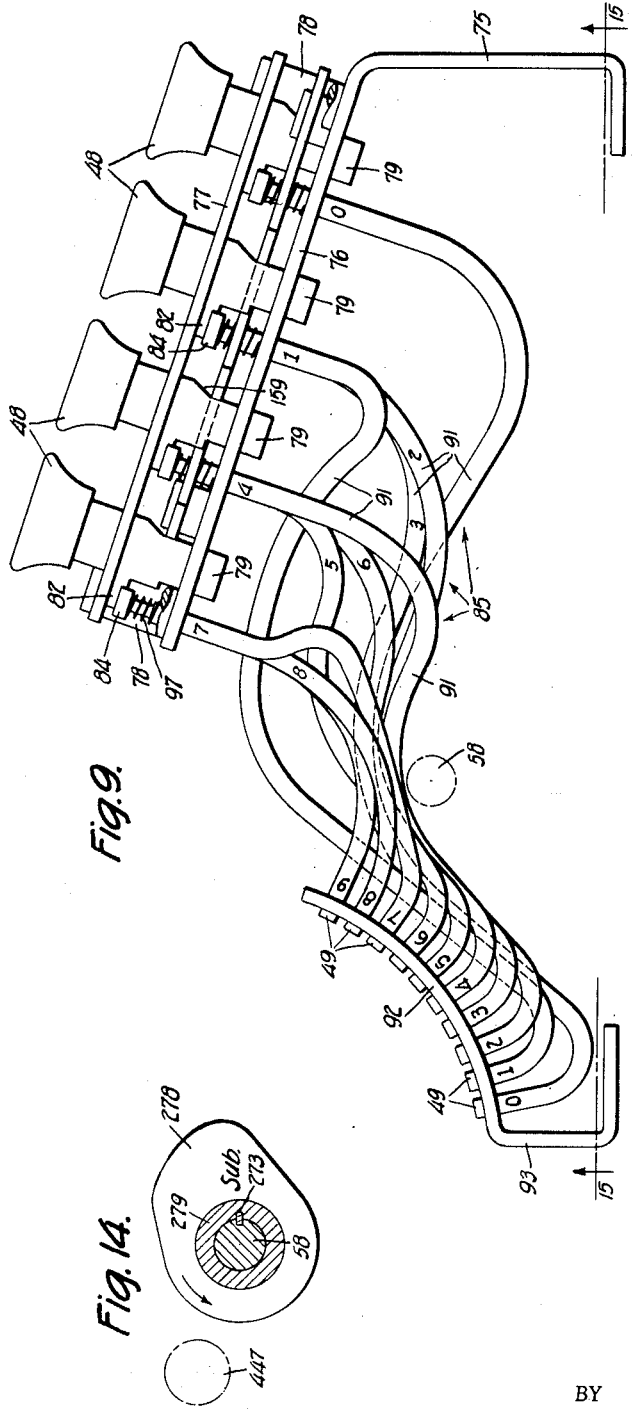
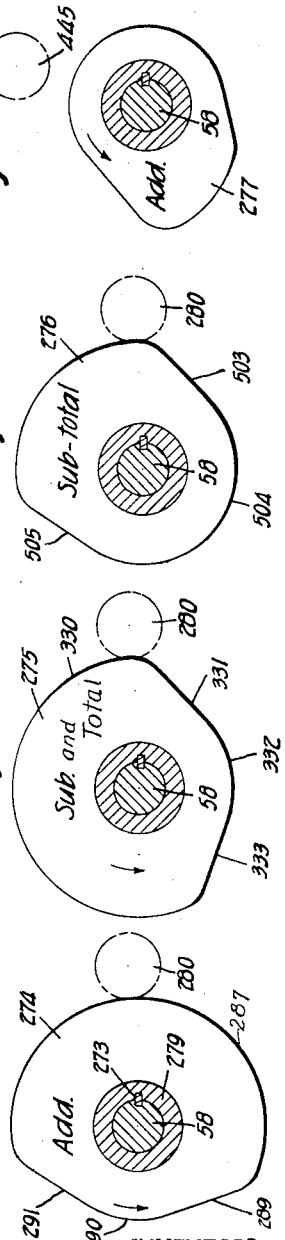
INVENTORS
Torkel E. Torkelson and
Robert S. Wallach
BY  *Duell and Kane*
ATTORNEYS

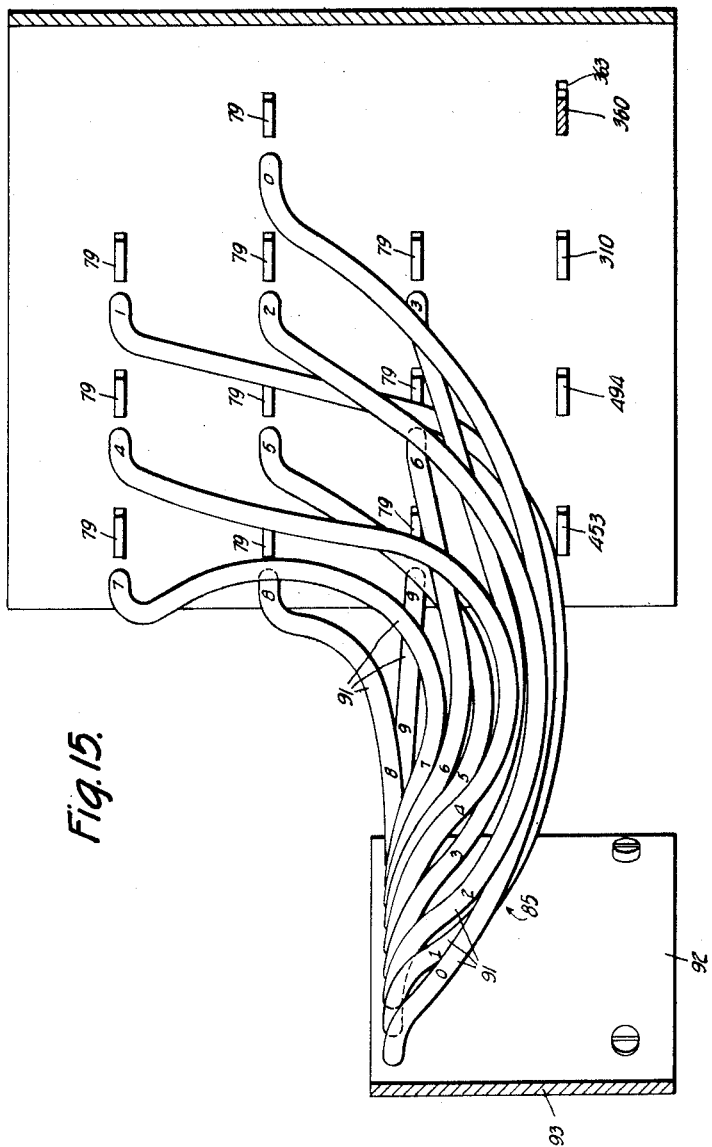

Jan. 26, 1954  R. S. WALLACH ET AL  2,667,304
CALCULATING MACHINE
Filed May 27, 1948  20 Sheets-Sheet 8
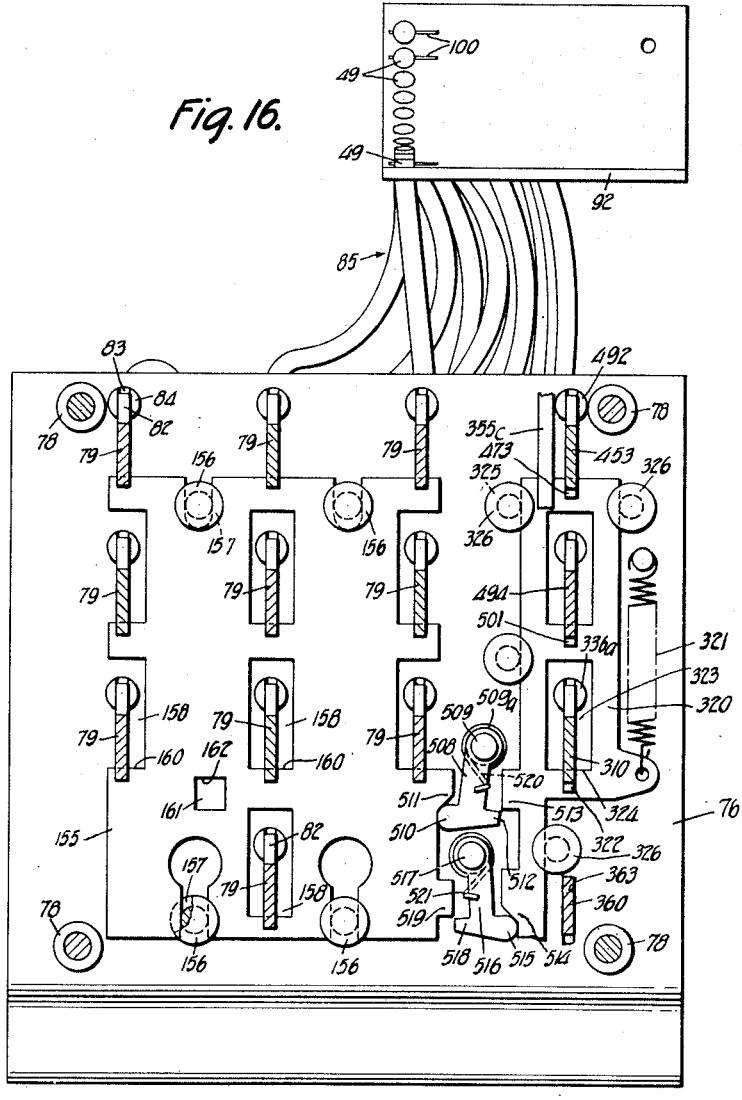
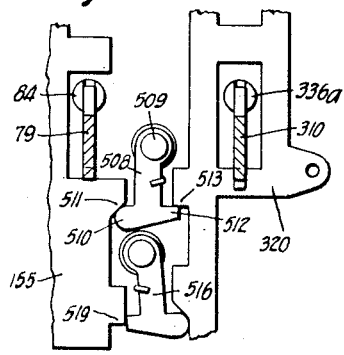
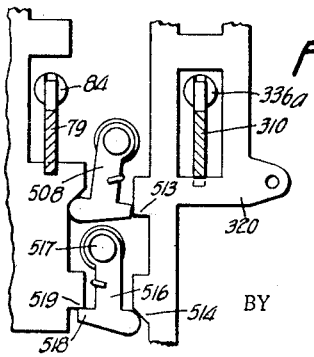
INVENTORS
Torkel E. Torkelson and
Robert S. Wallach
BY  Duell and Lane
ATTORNEYS Jan. 26, 1954 — R. S. WALLACH ET AL — 2,667,304
CALCULATING MACHINE
Filed May 27, 1948 — 20 Sheets-Sheet 9

INVENTORS
*Torkel E. Torkelson*
*Robert S. Wallach*

BY *Duell and Kane*
ATTORNEYS

Jan. 26, 1954    R. S. WALLACH ET AL    2,667,304
CALCULATING MACHINE
Filed May 27, 1948    20 Sheets-Sheet 14
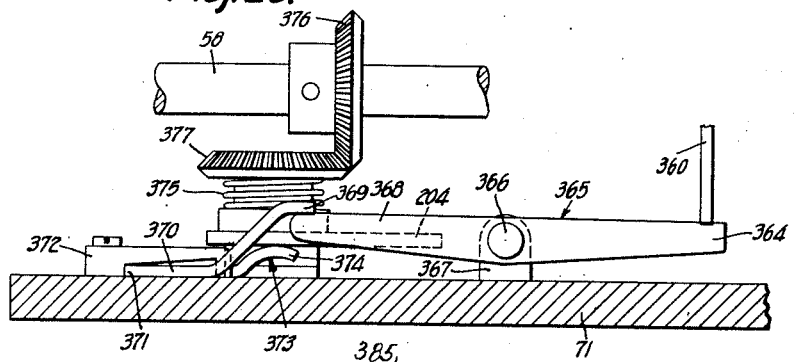
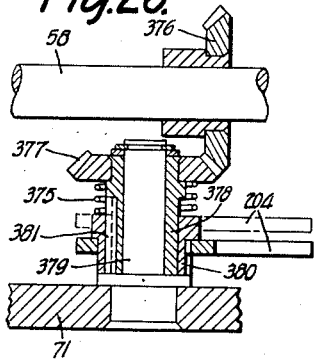
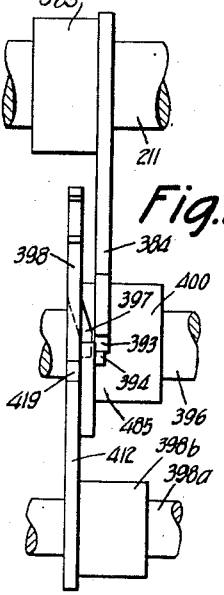
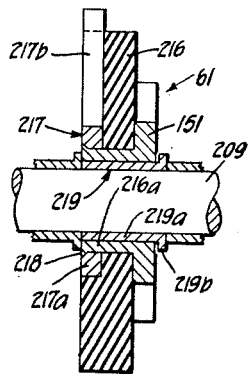
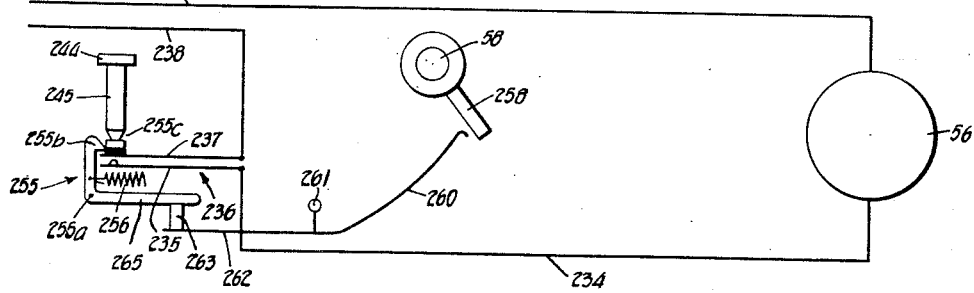
INVENTORS
Torkel E. Torkelson and
Robert S. Wallach
BY Duell and Kane
ATTORNEYS

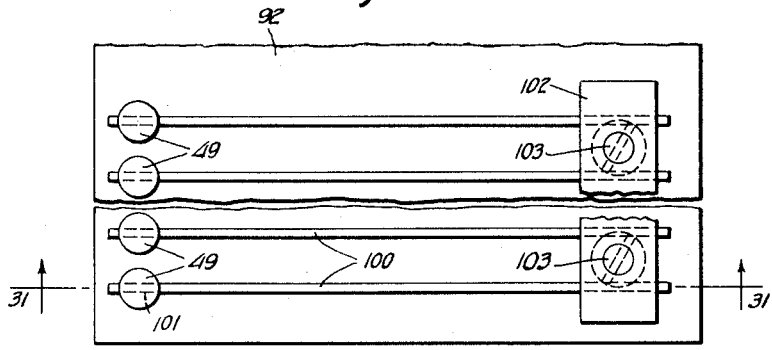
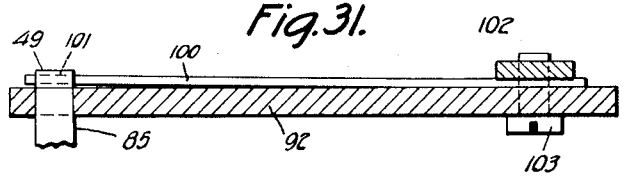
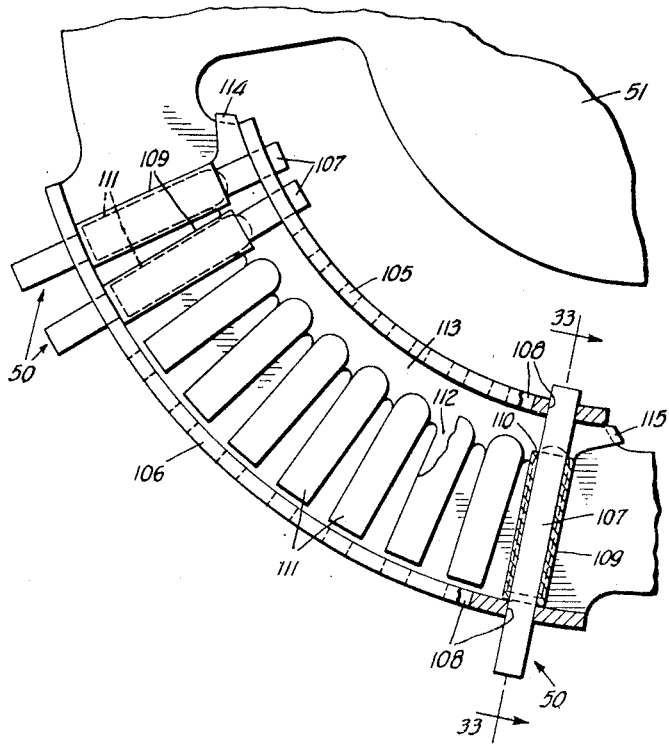
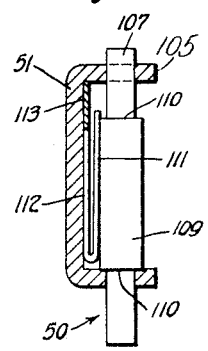

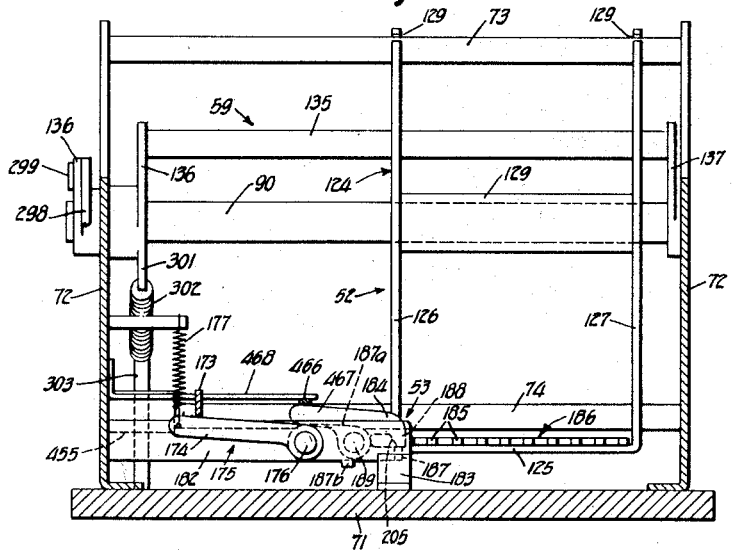

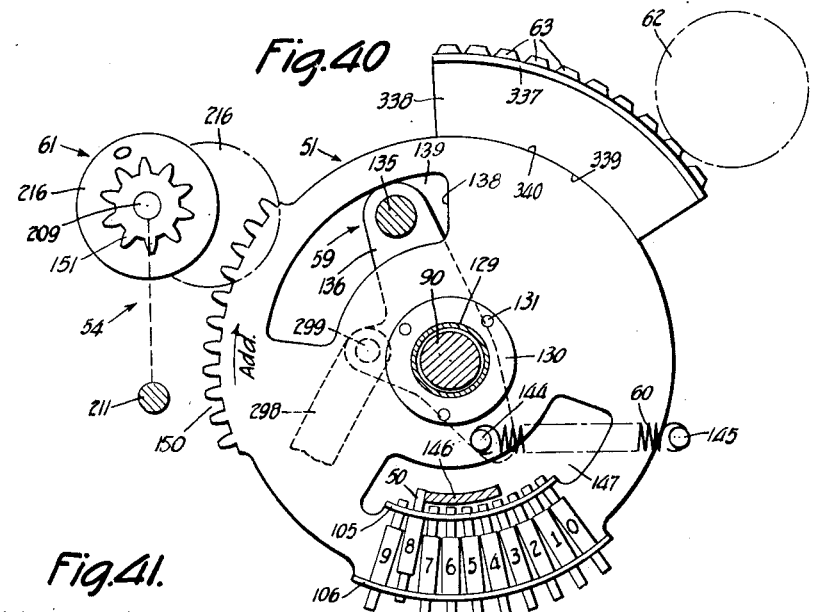

INVENTORS
Torkel E. Torkelson and
Robert S. Wallach

BY Duell and Kane
ATTORNEYS

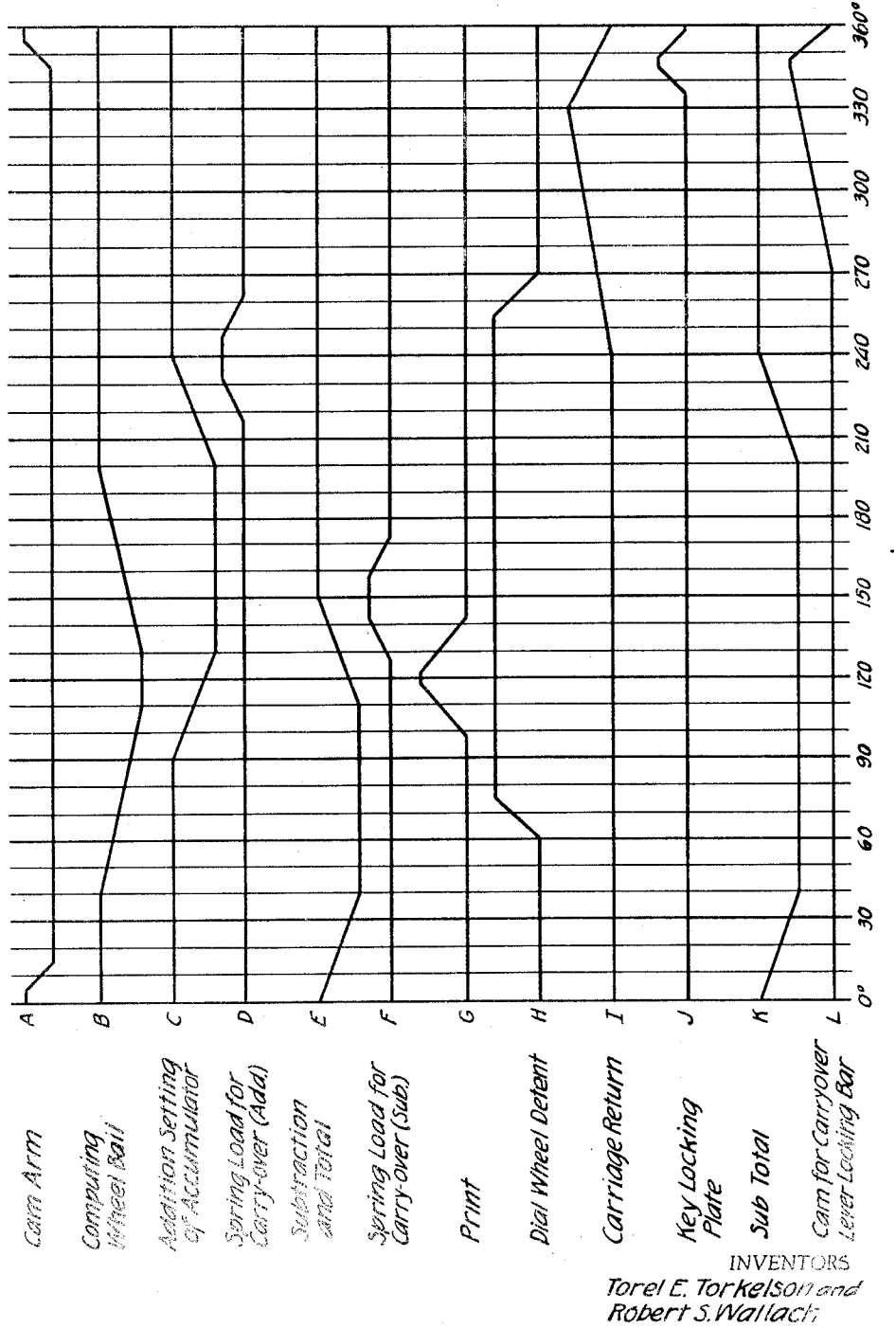

Patented Jan. 26, 1954

2,667,304

UNITED STATES PATENT OFFICE 2,667,304

CALCULATING MACHINE

Robert S. Wallach, Bernardsville, N. J., and Torkel E. Torkelson, Baldwin, N. Y., assignors to Associated Development and Research Corporation, New York, N. Y., a corporation of New York Application May 27, 1948, Serial No. 29,476

7 Claims. (Cl. 235—60.31)

This invention relates to computing machines, and more particularly to the kind in which a number is set up on a computer by means including numeral keys, is printed and transferred to an accumulator.

An object of the invention is to provide a highly efficient machine which may be manufactured economically so as to be marketable at a comparatively low cost. To this end the machine is composed of a minimum of parts, most of which are sheet metal stampings.

Heretofore the computing operation of low cost computing machines has been limited to addition. An object of the present invention is to provide in a low cost machine, a mechanism which can also subtract, and by which a total and a sub-total may be taken.

A feature of the invention relates to novel operating connections extending from the numeral keys to suitable setting devices whereby index pins, having values from 0 to 9, are settable.

Other features relate to an improved computer carriage and means for indexing the computing wheels.

Further features relate to a carry-over mechanism which may be used for addition and for subtraction, and means to correspondingly bias carry-over springs.

Still other features of the invention relate to an improved carriage feeding means and carriage return mechanism.

Another feature of the invention relates to an improved means for setting and restoring the index pins of the computing wheels.

Other features of the invention relate to a cam shaft or general operator, a motor drive, and a key control clutch whereby the general operator may be connected with the motor drive and means actuable by the general operator.

Other features relate to means for conditioning the machine for addition or subtraction.

Other features relate to means including a repeat key and means operable thereby to render the carriage return inactive.

Still other features relate to an improved total taking means and sub-total means.

Other features and advantages will hereinafter appear.

In the accompanying drawings which form part of the specification:

Fig. 2 is a side elevation of the machine as seen from the left of Fig. 1, some of the parts being omitted;

Fig. 3 is a detail side view, looking from the right in Fig. 1, of the spring loading cams associated with the carry-over mechanism;

Fig. 4 is a side elevation of the machine as seen from the right of Fig. 1, some of the parts being omitted;

Fig. 5 is a vertical section of the machine taken approximately on the line 5—5 of Fig. 1, some of the parts being omitted;

Fig. 6 is a detail view in vertical section of the key-engaged end of one of the operating connections extending between the numeral keys and the setting devices;

Fig. 7 is a detail view, in vertical section, of the other end of the key connection shown in Fig. 6;

Fig. 9 is a side view, as seen from the left side of the machine, of the numeral keys and their operating connections with the pin setting devices;

Fig. 10 is a side view, as seen from the right side of the machine, of the addition cam in its normal position;

Fig. 11 is a similar view to Fig. 10 of the subtraction and total cam;

Fig. 12 is a side view of the sub-total cam;

Fig. 13 is a side view of the spring loading cam to bias the carry-over springs for addition;

Fig. 14 is a side view of the spring loading cam to bias the carry-over springs for subtraction;

Fig. 15 is a bottom view in section taken on the line 15—15 of Fig. 9;

Fig. 16 is a plan view in section taken on the line 18—18 of Fig. 5, of the keyboard supporting plate showing particularly the locking means associated with the two groups of keys.

Fig. 17 is a fragmentary plan view showing one of the numeral keys operated and means operated thereby to lock the conditioning keys;

Fig. 18 is a view similar to Fig. 17 showing the numeral keys locked due to the operation of one of the conditioning keys;

Fig. 25 is a vertical section, taken on the line 25—25 of Fig. 24, showing principally the lifting mechanism for the carriage return cam to render it inactive;

Fig. 26 is a vertical section, taken on the line 26—26 of Fig. 24, illustrating principally the support for the carriage return cam;

Fig. 27 is a detail top view of one of the carryover sectors and associated parts;

Fig. 28 is a sectional view taken through one of the dial wheels and its support;

Fig. 29 is a diagrammatic view of the motor circuit;

Fig. 30 is a developed plan view of the plate which supports the row of pin setting devices;

Fig. 31 is a section taken on the line 31—31 of Fig. 30;

Fig. 32 is a side elevation of a portion of a computing wheel illustrating principally the friction springs for the index pins, most of the pins being omitted;

Fig. 33 is a sectional view, of the portion of the computing wheel shown in Fig. 33, taken on the line 33—33 of Fig. 32;

Fig. 34 is a front view, in section, taken on a vertical plane slightly in front of the computer carriage, some of the parts being removed and showing principally the carriage feed mechanism;

Fig. 35 is a fragmentary front view of the escapement mechanism, associated with the computer carriage, showing it operated to release the carriage from the loose dog and the carriage in engagement with the fixed dog while effecting a single space movement of the carriage;

Fig. 36 is a view similar to Fig. 25, showing the loose dog of the escapement operated to effect the release of the carriage by key operated means, so that it is free to run to the extreme left of the machine in order to position it for taking a total or a sub-total;

Fig. 37 is a top plan view of the cam unit in Fig. 24 showing it shifted to condition the machine for totalling;

Fig. 38 is a view similar to Fig. 37 showing the cam unit shifted still further to condition the machine for taking a sub-total;

Fig. 39 is a plan view, in section, of the cam unit;

Fig. 40 is a diagrammatic view showing one of the computing wheels arrested in its operated position by means of the "8" pin which has been previously set and immediately prior to swinging the accumulator into engagement with said computing wheel;

Fig. 41 is a view similar to Fig. 40, a portion of the computing wheel being broken away and showing the accumulator in engagement with the computing wheel and the latter returned to normal to thus add the value of 8 to the dial wheel of the accumulator;

Fig. 42 is a view similar to Fig. 40 showing that the value of 8 previously added to the dial wheel has been subtracted therefrom due to the rotation of the computing wheel in a counterclockwise direction;

Fig. 49 is a general operation time chart.

Similar reference characters represent similar parts throughout the specification.

GENERAL DESCRIPTION

Figure 1:
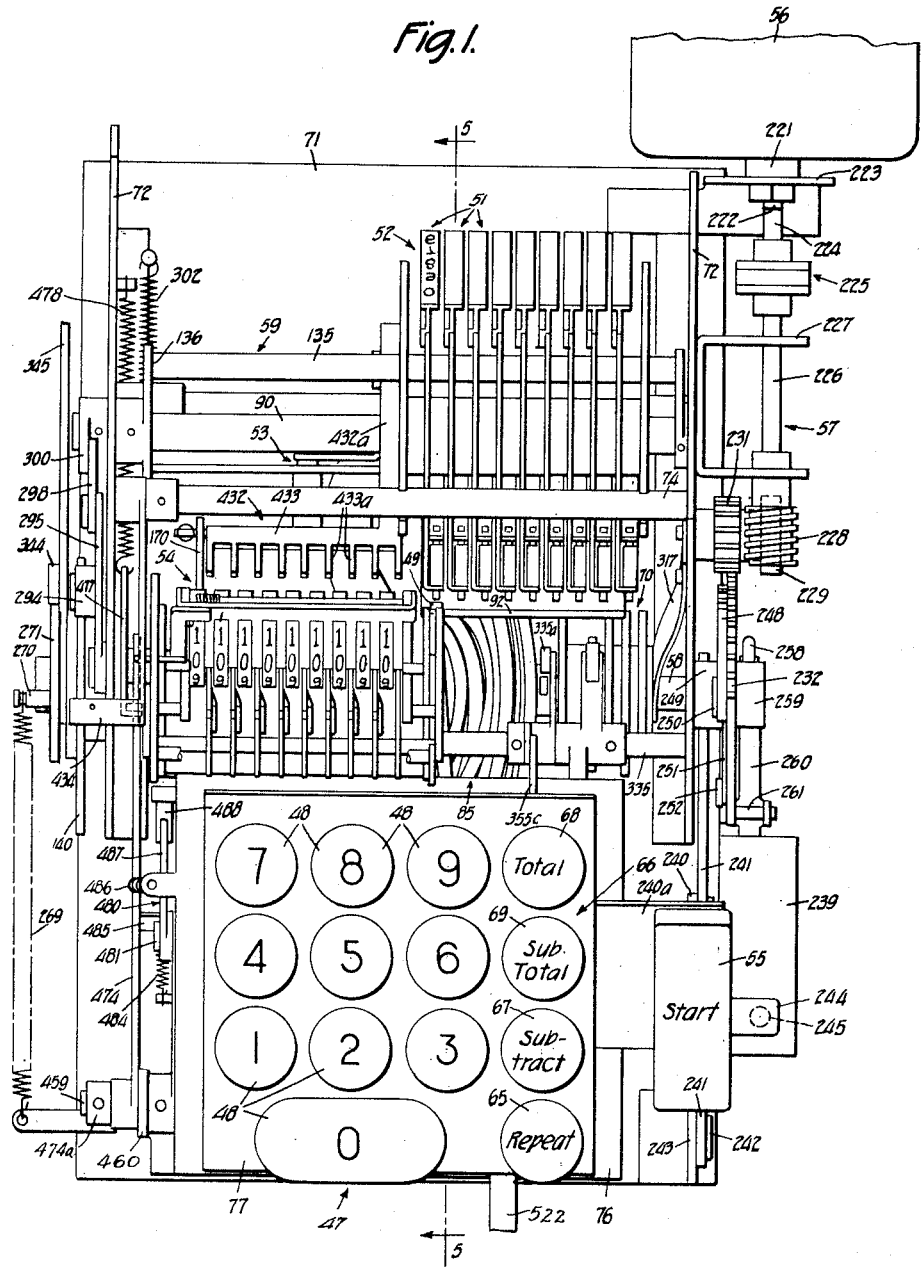
Fig. 1 is a plan view of the machine with some of the parts omitted.

The machine includes a group 47 of numeral keys 48, 0 to 9 respectively (Figs. 1 and 5). The numeral keys are each connected with a setting device 49 and the setting devices are arranged in a row extending fore-and-aft of the machine. The number to be computed may be set up by the setting devices 49, through the medium of index pins 50, on computing elements i. e. "wheels," 51 of a computer carriage 52. While the keys 48 are being actuated to set up the number, the computer carriage 52 is caused to feed digit spaces leftwardly of the machine through the operation of an escapement 53 (Fig. 34) which is actuable through means, hereinafter described, operable by the numeral keys 48. The carriage 52 is normally located to the right of an accumulator 54 as in Fig. 1. During the digit spacer step-by-step movements of the computer carriage it moves into overlapping relation with the accumulator 54 (Fig. 1), to a greater or less extent depending on the number of digits in the number to be computed, to successively present the computing elements 51 to the row of setting devices 49 for the purpose of setting the index pins 50.

After the number has been completely set, a start key 55 is depressed (Figs. 1 and 4), thus causing a motor 56 to start and actuate driving means 57 to rotate a main cam shaft 58, sometimes hereinafter referred to as a "general operator." During the operation of the shaft 58 a bail 59 is operated (Figs. 1, 2 and 5) thus permitting the computing wheels to be rotated in a counterclockwise direction (Fig. 5), each under the influence of an associated spring 60. These computing wheels move through varying extents depending on the values set index pins 50.

While addition is being performed, the computing wheels 51 rotate freely in a clockwise direction and computation is effected, or, in other words, their values are transferred to the accumulator 54 on the return movement of the computing wheels which is effected by the return stroke of the bail 59. Prior to the return movement, however, of the computing wheels 51, the accumulator 54 is actuated to swing it into cooperative relation with said computing wheels 51 and it is held there until the computing wheels have rotated suitable dial wheel units 61 on their return to normal to transfer to said dial wheel units the set up number.

Before the computing wheels 51 start their return movement, however, the set up number is printed on a suitable paper strip (not shown) fed around a platen 62. Printing is effected by actuating the platen 62, from the full line position in Fig. 5 to the dot-and-dash line position, against types 63 registered at the printing line. After the computing wheels 51 have been restored to normal, the accumulator 54 is returned to its normal position, out of cooperation with said computing wheels.

The computer carriage 52 is then returned to the right of the machine (Fig. 1) and out of overlapping relation with the accumulator 54. During the return movement of the carriage, the previously set index pins 50 are restored to their normal positions by a zero setting cam 64 (Fig. 19) to thus clear the computing wheels 51 preparatory to setting another number to be used in a subsequent computation.

There is also provided a repeat key 65 (Figs. 1 and 23) which may be locked in its operated position and is effective through suitable mechanism, hereinafter described, to prevent the return of the computer carriage 52, thus leaving said computer carriage in the position to which it has been fed with reference to the accumulator and also leaving the index pins 50 in their set positions on the active computing wheels. With the repeat key in its operated position it is merely necessary to operate the start key 55 as many times as the set up number is to be run into the accumulator. When a number is no longer repeated the computer carriage is moved manually to the extreme right, which restores all set index pins and also releases the repeat key.

Figure 23:
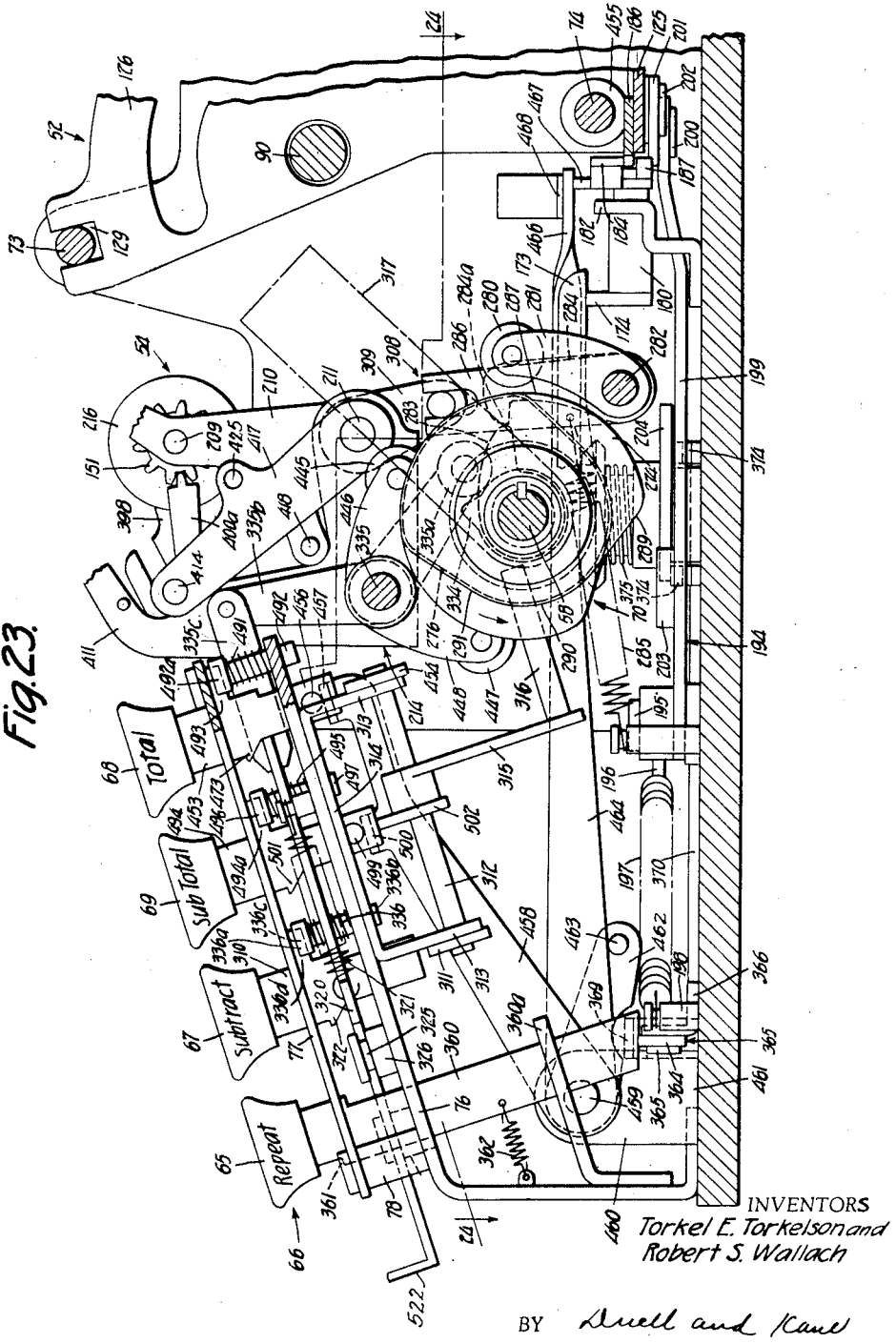
Fig. 23 is a fragmentary, sectional side view of the machine on a larger scale, as seen from the right hand side of Fig. 1 showing principally the addition and subtraction cams and the key operated means whereby the cam unit may be set to its various positions axially of the general operator shaft. This figure also shows the repeat key mechanism and the carriage return mechanism.
Figure 24:
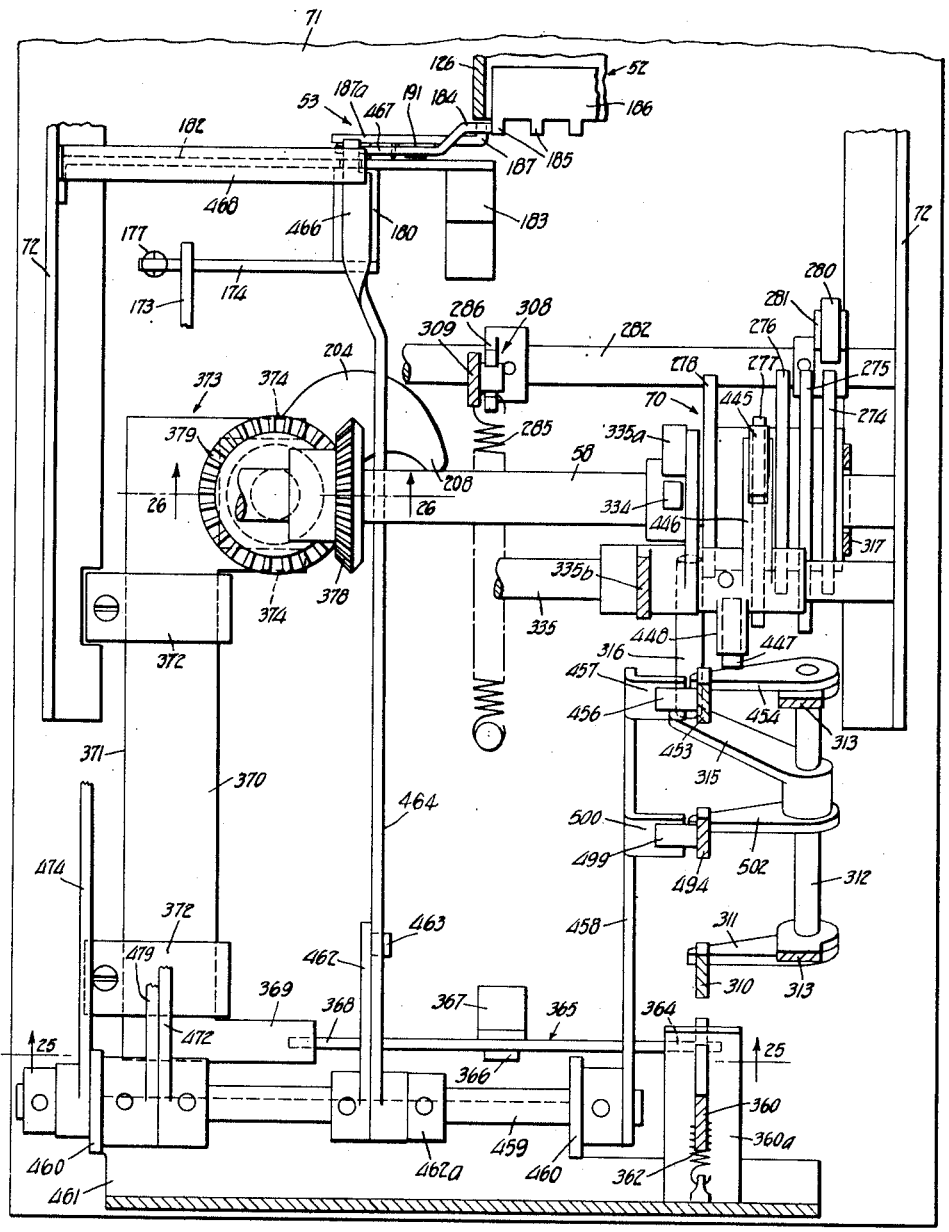
Fig. 24 is a plan view in section taken substantially on a line 24—24 of Fig. 23.

The machine is further provided with a group 66 of conditioning keys, namely, a subtraction key 67, a total key 68, and a sub-total key 69, which keys control suitable mechanism, hereinafter described, to set a cam unit 70 (Figs. 23 and 24). The cam unit 70 is normally set to effect addition.

When subtraction is to be performed, the subtraction key 67 is operated to shift the cam unit 70 axially of the shaft 58 and rightwardly thereof to the position in Fig. 37. In this position the cam unit 70, when operated by the shaft 58, causes the accumulator to be actuated into cooperative relation with the active computing wheels 51 before they are actuated from their normal positions by their springs 60. While the computing wheels are being thus actuated, the dial wheels are rotated thereby in a clockwise direction to effect subtraction, this rotation being reverse to that in which the dial wheels are rotated for addition. Printing of a subtracted number occurs, as in addition, while the computing wheels are arrested in their operated positions but subsequent to transfer of the set up number to the accumulator.

When a total is to be taken the total key 68 is operated to set the cam unit 70 in its subtraction position (Fig. 37). The escapement 53 is also actuated to the position in Fig. 36 to release the computer carriage 52 which is then moved, by means hereinafter described, to its extreme left position. The start key 55 is then depressed to effect the actuation of the cam shaft 58 to thereby swing the accumulator into engagement with the computing wheel 50. Subsequently the bail 59 moves forwardly to the position in Fig. 40, thus permitting the operation of the computing wheels in mesh with the active dial wheels 61 of the accumulator until the dial wheel units 61 reach their zero position where they are arrested by means hereinafter described.

While the active dial wheel units 61 are being restored to their zero positions, the number registered thereby is transfererd to the computing wheels 51 thus setting the types 63, corresponding to the transferred number, in register with the printing line. The platen 62 is then operated to swing it against the registered types to print the total. The accumulator is returned and the computing wheels are rotated back to normal. The computer carriage is then returned to its normal position at the right of the machine (Fig. 1).

Upon the depression of the key 69 to take a sub-total the cam unit 70 also is shifted rightwardly on the shaft 58 but to a third position (Fig. 38). The carriage 52 is also released and positioned in its extreme left position as in the case of total taking above described. The start key 55 is then depressed to effect swinging of the accumulator into engagement with the computing wheels 51. Subsequently the bail 59 swings forwardly to permit the operation of the computing wheels and thus transfer the number registered on the accumulator to the computing wheels. This number (sub-total) is then printed by the actuation of the platen 62 against the types 63 registered at the printing line. The accumulator is maintained in cooperation with the computing wheels 51 while the latter are being returned to normal by the bail 59 to effect the return of the number on the computing wheels to the accumulator. The accumulator is subsequently swung back to normal and the carriage 52 is returned to its extreme right position. The computation may continue.

A detail description of the machine will now be given.

*Main frame*

The frame of the machine includes a base plate 71 to which are secured two side plates 72, having tie rods 73 and 74 between them. A plate 75 is suitably secured to the upper face of the base plate 71 and near the front of the latter. The plate 75 extends upwardly and then slants rearwardly of the machine to form a lower key guide-plate 76. An upper key guide-plate 77 is supported on the plate 76 by means of posts 78 and extends parallel to the guide plate 76.

*Numeral key connections*

The numeral keys 46 are provided with stems 79 guided in individual slots 80 (Fig. 5) formed in the lower plate 76 and slots 81 in the upper plate 77. Each stem 79 is provided with a lug 82 extending into a slot 83 in a head 84 forming part of an operating connection 85 extending from the key stems 79 to one of the pin setting devices 49.

The pin setting devices 49 are arranged in an arcuate row extending about a shaft 86 and are located in a vertical plane extending fore and aft of the machine. The stems 79 of the numeral keys 46 are arranged in three parallel vertical rows also extending fore and aft of the machine, with at least two of said rows offset with reference to the plane in which the pin setting devices 49 are located (Figs. 15 and 16).

The key connections 85, therefore, consist of tubes 91 which extend from the three rows of key stems 79 to the single row of setting devices 49 and are bent as shown in Figs. 5, 9 and 15 to clear each other and the cam shaft 58. The rear ends of the tubes 91 extend radially into a curved plate 92 and are secured thereto by soldering or welding, the plate 92 having a bracket 93 by which it is secured to the base plate 71.

Constrained within each of the tubes 91 is a flexible thrust rod herein shown as a closely wound spring 94 which may move back and forth therein freely. Upon the depression of a numeral key 48, the head 84 operated thereby engages one end of the spring 94 to actuate it lengthwise in the tube 91 and force the associated setting device 49 at the other end of said spring towards the center of the shaft 90 to thus set one of the index pins 50 of the computing wheel registering with the row of setting devices 49.

When the finger is removed from the depressed numeral key the spring 94 is restored to its normal position to retract the operated pin setting device. For this purpose there is provided a return spring 97 (Fig. 6) which is located between the plate 75 and the head 84, the latter being provided with a shank 98 which extends into one end of the spring 94 and which end is attached to said shank. It will be understood that as the spring 97 restores the head 84 the associated key 48 is returned and the spring connection 94 is also returned to normal. Each setting device is also provided with a shank 99 (Fig. 7) secured to the other end of the spring connection 94. Each setting device is further provided with a return spring 100 (Figs. 7, 30 and 31) which assists in returning the thrust rod 94 in the tube 85. These springs 100 engage each at one end in a hole 101 of setting device 49 and extend laterally over the curved plate 92. All of the springs 100 are secured at their other ends by a bar 102 under which they extend, said bar 102 being secured to the plate 92 by screws 103.

Indexing means

The indexing means includes a set of ten index pins 50 on each computing wheel 51, said pins having values of 0 to 9 as indicated in Figs. 5 and 40. Each set of pins 50 is supported on its computing wheel 51 by concentric lips 105 and 106 (Figs. 32 and 33). Each index pin 50 is composed of a shaft portion 107 slidingly engaging in holes 108 in said lips and has a tightly fitting collar 109 thereon which provides shoulders 110 to arrest the pin in radial movements against the lips 105 and 106 respectively. The shaft and sleeve structure of the index pins 50 provide a simple structure to facilitate assembly of the pins 50 on the computing wheels.

When a row of index pins 50 is in the same plane as the setting devices, the pins and setting devices of same value register as in Fig. 5 and any pin may be set inwardly by the corresponding setting device 49. Each index pin 50 is held in either of its positions by a friction spring 111. Each friction spring 111 is bent up from an arm 112 extending radially from a curved body part 113. The body part 113 lies against the side of the computing wheel and engages under the lip 105. The body part has formed on its opposite ends lips 114 and 115 which engage behind shoulders 116 and 117 of the computing wheel to prevent shifting of the springs 111 out of alignment with their associated index pins 50.

Computer structure

The computer carriage 52 includes a U-shaped frame 124 (Figs. 5, 19 and 34) comprising a crossbar 125 and upwardly extending side plates 126 and 127. Said carriage frame 124 is supported on the tie rods 73 and 74, the latter passing through apertures 128 in the side plates 126, 127, the tie rod 73 engaging in slots 122a formed in the upper ends of said side plates. The carriage 52 further includes a tubular shaft 129 (Fig. 19) through which the shaft 90 extends. The ends of the shaft 129 extend into apertures 129a in the side plates 126 and 127 of said carriage and its ends terminate short of the outer faces of the end plates so that the outer ends of the apertures 129 may be peened as at 129b to prevent the shaft 129 from shifting axially in the carriage frame. The shaft 90 is of slightly smaller diameter than the inside diameter of the tubular shaft 129 so that the latter may move freely over the shaft 90 which is stationary and pivotally supported in the end plates 72 of the machine frame.

Each computing wheel 51 is provided with a hub 130 suitably secured thereto by rivets 131 or in any other suitable manner. The computing wheels are supported on the tubular shaft 129 and are arranged between the side plate 127 of the carriage 52 and a spacer 132 which engages the side plate 126.

Operation of computing wheels

The computing wheels 51 are normally held in the position shown in Fig. 5 by the bail 59 which includes a cross-bar 135 (Figs. 1, 5, and 19) supported by arms 136 and 137 secured to the shaft 90. The cross-bar 135 extends through slots 135a in the end plates 126 and 127 of the computer carriage frame 124 and normally engages abutments 138 forming the rear ends of slots 139 in the computing wheels 51 and through which slots 139 the cross-bar 135 extends. The bail 59 is operable by means, hereinafter described, including a cam 140 (Fig. 2) secured to the shaft 58 to actuate the cross-bar 135 from its normal position (Fig. 5) to the position in Fig. 40. Thus all of the computing wheels 51 are freed and permitted to be rotated by the coil springs 60, one end of each spring being connected to a pin 144 on the computing wheel, the other end of all of the springs 60 being connected to a rod 145 supported by and extending between the side plates 126 and 127 of the computer carriage 52. The computing wheels 51 are rotated in a counterclockwise direction (Fig. 40) through angular distances commensurate with the values of the set index pins 50.

The computing wheels 51 are arrested in their operated positions by engagement of the set index pins 50 with a stop bar 146 (Figs. 5 and 40). The stop bar 146 extends through slots 147, formed in the computing wheels 51, and is secured at its ends, to the side plates 126 and 127.

Each computing wheel 51 is provided with a rack 150 to engage a pinion 151 of the dial wheel unit 61 to rotate the latter at the proper time by means hereinafter described.

The cooperation of the computing wheels with the accumulator 54 does not occur until the last digit of the number has been set and the start key 55 is operated, after the carriage is in overlapping relation with the accumulator 54 a number of spaces corresponding to the number of digits in the number indexed on the computing wheels 51.

It will be remembered that the computing wheels are operated by individual springs 60, and that they are normally held against the action of these springs by the cross-bar 135 of the bail 59 which is normally in the position shown in Fig. 5, but which during each computing operation is caused to swing forwardly to the position shown in Fig. 40, thus permitting the computing wheels to be operated by their springs until they are arrested by the set index pins. Since the cross-bar 135 of the bail 59 controls all of the computing wheels, the inactive ones to the right of the dial wheel unit of lowest order, or in other words those not used to compute the set number, are also actuated forwardly by their springs 60 but they do not print. To this end provision is made to permit the inactive computing wheels to operate until they are arrested by the abutments 138, at the ends of the slots 139, against the cross-bar 135 in its operated position, thus carrying all of the types 63, of the inactive computing wheels beyond the printing to prevent printing thereby.

Carriage feed

It will be understood that at the beginning of a computing operation the computer carriage 52 is in its normal position to the right of the machine (Fig. 1) so that the index pins 50 on the first computing wheel at the left of the carriage 52 are in register with the row of pin setting devices 49. Consequently when any one of the numeral keys 48 is operated, its associated pin setting device 49 actuates the associated index pin of same value thus setting the first digit of the number. Immediately following, the computer carriage 52 is fed leftwardly one digit space by the escapement 53 to locate the first computing wheel 51 in alignment with the pinion 151 of the first dial wheel unit 61 from the right. Simultaneously the second computing wheel 51 is carried into register with the row of pin setting devices 49 for the purpose of setting the index pin corresponding in value to the next digit of the number to be computed.

The carriage escapement 53 is operated by any one of the numeral keys 48 in the following manner. Associated with the stems 79 of said numeral keys is a plate 155 (Figs. 5, 8 and 16), slidably supported upon the plate 76 by means of posts 156 having grooves 157 in which the plate 155 is guided. The plate 155 has slots 158 through which the key stems 79 extend. Each key stem 79 has a cam 159 which, during the depression of its numeral key 48, engages the forward edge 160 of the slot 158 thus causing the plate 155 to move forwardly of the machine. The plate 155 is provided with another slot 161, the rear end 162 of which engages with and actuates a finger 163 extending upwardly therethrough to rock a shaft 164 supported in an inverted U-shaped bracket 165 secured to the bottom of the plate 76. The finger 163 has an extension 163a projecting downwardly from the shaft, and to which a return spring 163b is connected. The finger 163 is secured to one end of the rock-shaft 164 and an arm 166 is secured to the other end of said rock-shaft. When the latter is operated the arm 166, through a pin-and-slot connection 167, rocks a lever 170 in a clockwise direction (Fig. 5) about a pivot stud 171 on a bracket 173 secured to the left side plate 72 of the main frame. The rear end of the lever 170 extends over the free end of an arm 174 of a dog-rocker 175 of the escapement 53, to actuate said dog-rocker, in a counterclockwise direction (Fig. 34), to rock a shaft 176, against the action of a return spring 177 to the position shown in Fig. 35.

The rock-shaft 176 is supported in a hub 180 (Fig. 8) extending forwardly from a bracket 182 secured at its left end to the side plate 72 at the left side of the machine frame. The bracket 182 is supported at its inner end by downwardly extending leg 183 (Fig. 34).

By an inspection of Fig. 34 it will be observed that a loose dog 184, of the escapement 53, normally engages one of the teeth 185 of a feed rack 186 suitably secured to the cross-bar 125 of the computer carriage 52. A fixed dog 187 of the escapement 53 is formed on the end of an arm 187a secured to the rear end of the rock-shaft 176. Said loose dog is normally free of and below the path of travel of the feed rack 186. When, however, the dog-rocker 175 is actuated to the position shown in Fig. 35, a nose 188 of the loose dog 184 is raised to the position in Fig. 35, clear of the rack tooth 185, and the fixed dog 187 is brought into the path of said rack tooth. The engaging faces of the dogs 184 and 187 are offset slightly with reference to each other so as to permit a slight feeding movement of the carriage 52 to advance the tooth 185 under the nose 188 of the loose dog, as shown in Fig. 35.

Upon the return movement of the numeral key 48 to its normal position, which occurs immediately after the finger of the operator is removed from the key, the plate 155 is restored by the return spring 163b which permits the return of the dog-rocker 175 to its normal position, thus removing the fixed dog 187 from the path of travel of the tooth 185. The nose 188 of the loose dog 184, however, engages the top face of the rack tooth 185 and is actuated about its pivot stud 189 by which it is supported on the arm 187a of the dog rocker 175, the arm 187a engaging a stop 187b on the bracket 182 to arrest the dog rocker 175 in its normal position. Return spring 191 for the loose dog 184 is coiled around the pivot 189 and normally holds the nose 188 of the loose dog against the fixed dog 187 which extends under said nose. As soon as the dog rocker returns, the carriage 52 is freed from the fixed dog 187 and is urged leftwardly in Fig. 24. The tooth 185 slides under the nose 188 of the loose dog and subsequently the nose 188 drops into the space between the previously engaged rack tooth 185 and the next succeeding one. Thus the carriage is advanced one space to carry the first computing wheel with its set index pin into register with the pinion 151 of the dial wheel unit of lowest order. At the same time the second computing wheel is carried into register with the row of setting devices 49 so that in case the number has another digit it may be set up on the second computing wheel in a manner similar to that above described in connection with the first computing wheel.

Thus it will be understood that after all the digits of the number have been set, the computer carriage overlaps the accumulator by as many denominational positions as there are digits in the number. The number is then ready to be transferred to the accumulator which is accomplished in a manner hereinafter described.

Figure 8:
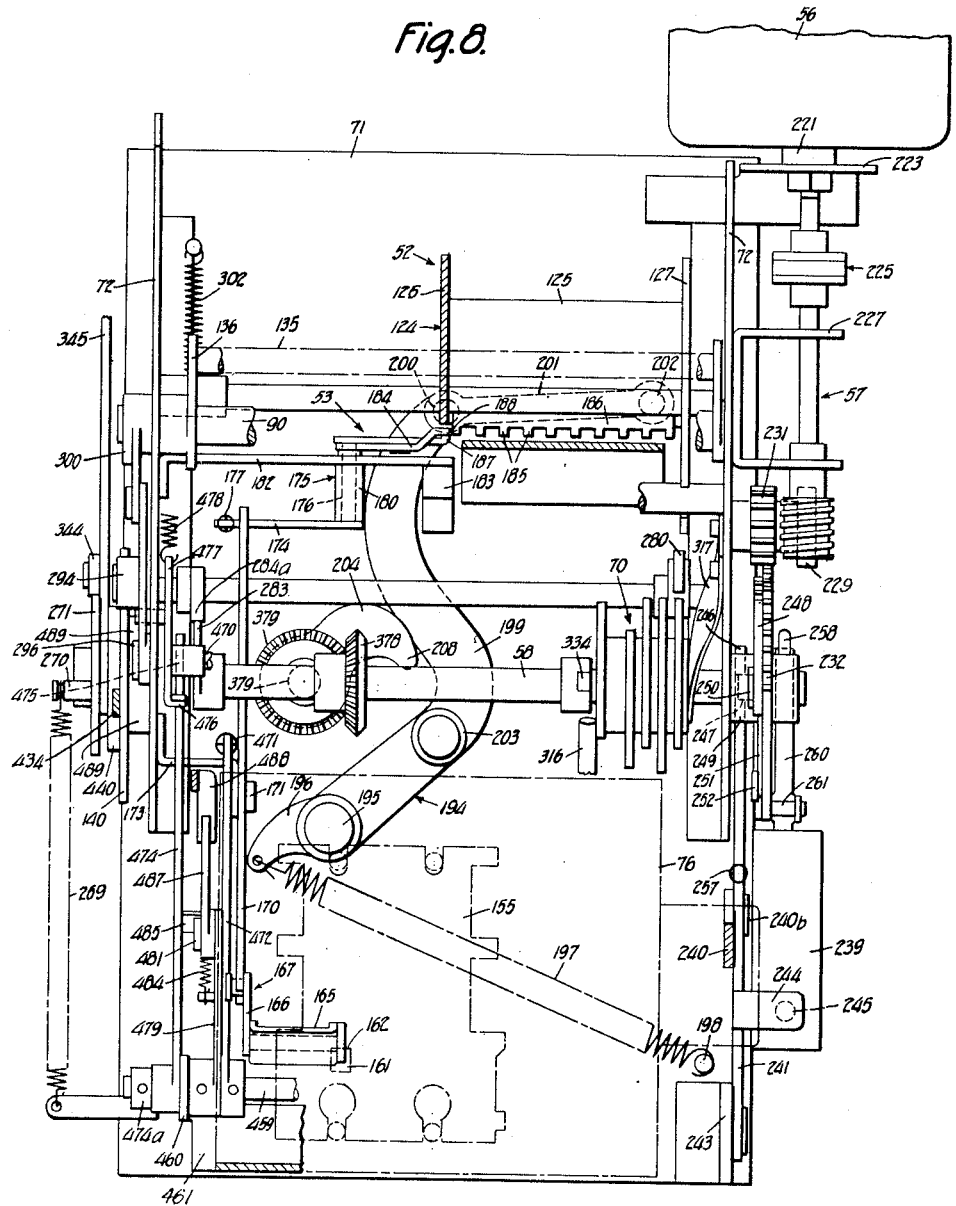
Fig. 8 is a plan view of the machine, with some of the parts removed, to show the underlying structures, principally the carriage feed and the carriage return mechanisms.

In Figs. 8, 24 and 34 it will be seen that the escapement 53 is coextensive with the feed rack 186 and it is for the greater part located in front of the path in which the teeth 185 travel. The nose 188 of the loose dog 184 however, is offset rearwardly relative to the body thereof as in Fig. 8, and extends into the path of the rack teeth 185 to cooperate therewith. This arrangement permits the pivot 176 of the dog rocker 175, the pivot 189 of the loose dog, and the nose 188 of the latter, to lie in the same horizontal plane in which the rack teeth 185 are located. Consequently there is no tendency of the carriage to actuate the loose dog or the dog rocker from their normal positions.

*Carriage propelling means*

To propel the carriage leftwardly there is provided a lever 194 (Figs. 8 and 23) pivotally supported on a stud 195 secured to the base plate 71 of the machine. Said lever is provided with a short arm 196 to the free end of which is connected a spring 197 extending to a pin 198 also secured to the base plate 71. The lever 194 also includes a long bent arm 199, the free end of which is connected by a pivot stud 200 to one end of a link 201, the other end of the link 201 being connected by a pivot stud 202 to the crossbar 125 of the computer carriage 52. Thus it will be understood that the spring 197 acting through the lever 195 and link 201 urges the computer carriage 52 leftwardly in Fig. 8 and causes the step-by-step movement thereof upon the return movement of the numeral keys and under the control of the escapement 53 above described.

By an inspection of Figs. 5, 8, and 23 it will be seen that the leg 193 of the bracket 182 which supports the dog rocker 175 is offset so as not to interfere with the movement of the bent arm 199, of lever 194, which arm moves freely thereunder and under the bracket 182.

The lever 194 is provided with a follower roller 203 which, at the proper time, is engaged by a cam 204, rotatable by means hereinafter described, to engage the follower 203 and thus actuate the lever 199 in a clockwise direction to return the carriage, against the action of the spring 197, to its extreme right position after a computing operation and preparatory to another computing operation.

During the return movement of the computer carriage 52 to normal, the rack teeth 185 of the feed rack 186 engage a slanting face 205 (Fig. 34) on the nose 188 of the loose dog 184 to lift said nose against the action of the return spring 191 and thus permit freedom of the return movement of the carriage. The carriage 52 is moved rightwardly until the first rack tooth 185 at the left end of the rack 186 is one digit space distance beyond the nose 188 of the loose dog 184 for a purpose described later. The nose 188 snaps into the path of said first rack tooth and the carriage then advances until it is arrested in its normal position by engagement of the first tooth 185 in engagement with the nose 183. In this position of the carriage the first computing wheel is one digit space to the right of the pinion 151 of the dial wheel of lowest denominational order and the index pins 50 of the first computing wheel 51 are in register with the row of setting devices 49.

*Index pin restoring*

It will be remembered that the index pins 50 are arranged radially in an arc about the shaft 99 and that to set them they are moved inward as the 8 pin in Fig. 40, and that the index pins are set one at a time on the computing wheels as said wheels are brought successively into register with the row of pin setting devices 49. To restore the index pins 50, after a computing operation, or in other words to clear the computing wheels of the numerical value set thereon, the set pins 50 are caused to engage the cam 64 which serves as a wiper to restore them. Since the indexing pins are located in an arc, the wiper cam 64 which is located in the slots 147 (Figs. 5 and 19) is also curved or arcuate and extends over the entire row of index pins 50 fore-and-aft of the machine. The wiper 64 is formed on the inner end of a curved plate 206 (Fig. 19) secured to the right end 72 of the main frame by screws 207.

Figure 19:
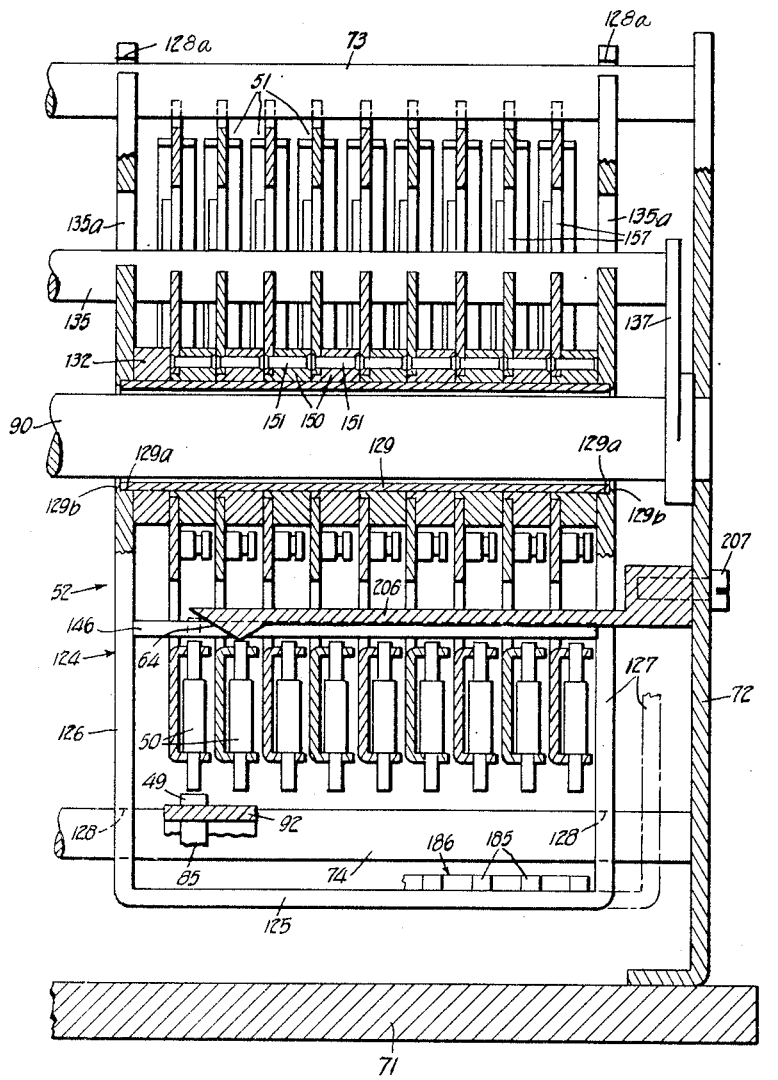
Fig. 19 is a vertical section of the computer carriage taken substantially on the line 19—19 of Fig. 5.

As illustrated in Fig. 19, the indexing pins on the first computing wheel at the left of the carriage stand clear of the wiper cam 64, thus permitting any one of them to be set without interference by said wiper upon the depression of a numeral key 48, which numeral key also initiates the operation of the carriage escapement 53. During the return of the numeral key, the escapement is further operated thus effecting one digit space feed of the carriage to bring the first computing wheel into register with the dial wheel of lowest order and at the same time bringing the row of index pins on the next succeeding computing wheel into register with the row of setting devices 49. Thus the index pins on the second computing wheel are carried to the left of the wiper and clear thereof so that one of them may be set.

When the computer carriage is returned, in the manner above described, it is moved to the dot-and-dash line position indicated at the right in Fig. 19, thus causing all of the set pins 50 to ride under the cam 64 which moves them outwardly to their normal positions on the various computing wheels. The object of moving the carriage to this position is to cause the set pin 50 on the first wheel 51 to also be restored by the wiper 64. While the carriage is in this position, the first tooth 185 of the feed rack 186 is one digit position away from the nose 188 of the loose dog of the escapement. As soon as a nose 208 (Fig. 8) of the carriage return cam 204 passes the follower 203 on the carriage return arm 194, the compter carriage 52 is again moved leftwardly (Fig. 8) by the spring 197 until it is arrested in the full line position (Fig. 19) by the loose dog 184 of the escapement 53. The row of index pins 50 on the first computing wheel 51 is then in register with the row of setting devices 49.

*Accumulator frame and dial wheel units*

The accumulator (Fig. 43) has a frame including a shaft 209 upon which the dial wheel units 61 are mounted. This shaft 209 is carried by two arms 210 secured to and extending upwardly from a rock-shaft 211, the latter being supported in side plates 212 bent up from a cross-plate 213 of a U-shaped accumulator supporting frame 214 which is attached by a bracket 215 to the left side plate 72 of the main frame. The accumulator frame is actuable by means hereinafter described to carry the dial wheel units 61 into cooperative relation with the computing wheels 51.

Each dial wheel unit 61 includes a body part 216 (Fig. 28), composed of moldable material such as "Bakelite," which may be molded around a bearing hub 216a, of the pinion 151, and having numerals from 0 to 9 thereon. The pinion 151 bears against the right side of the body part 216. At the other end of each hub 216a there is provided a carry-over element 217 consisting of a disc-like portion 217a having a radially extending finger 217b, see Fig. 44 also, projecting beyond the periphery of the body part or dial wheel 216 to initiate carry-over operations from one dial wheel to another as hereinafter described. The element 217 is embedded in the left side of the dial wheel 216 with its left face flush with the corresponding face of said dial wheel. The hub 216a extends through the portion 217a of the carrty-over element 217 and is peened at 218 to hold the various members of the dial wheel unit 61 together.

Each dial wheel unit 61 is supported on the shaft 209 through the medium of a sleeve 219 having a bearing portion 219a and a flange 219b at one end thereof. The sleeves 219 are arranged end to end on the shaft 209 and the flanges 219b serve as spacers to keep the dial wheel units 61 properly separated. The length of each bearing portion 219a is slightly greater than the entire length of the bushing 216a so as to insure freedom of rotation of the dial wheel unit 61 thereon and to reduce the friction to a minimum.

Power drive

The power drive is illustrated principally in Figs. 1, 4 and 8 and constitutes the motor 56 which is normally at rest. It is resiliently supported, by rubber washers 221 and screws 222, on a bracket 223 secured to the base plate 71, the rubber washers 221 preventing the transmission of vibrations of the motor, while running, to the main frame. A motor shaft 224 is connected, through a suitable coupling 225, with a shaft 226 supported in a U-shaped bracket 227 secured to the right side plate 72 of the main frame. The shaft 226 of the driving means 57 has secured to its forward end a worm 228 to drive a worm wheel 229 rotatable on a stub shaft 230 secured to the side plate 72. A pinion 231 is secured to the worm wheel 229 to be driven therewith. The pinion 231 in turn may drive a gear 232 secured to the shaft 58 to rotate the latter.

Motor circuit

The motor 56 is connected in a circuit including a source of power, not shown, by which electric current is supplied to a conductor 233 (Fig. 29) connected to the motor 56. A conductor 234 extends from the motor to one contact 235 of a switch 236, the other contact 237 of said switch being connected by a conductor 238 to the source of power. The switch 236 may be of the kind known in the market as the "microswitch." It is diagrammatically indicated in Fig. 29 and is enclosed in a case 239 (Fig. 4). It is normally open and consequently the motor is normally at rest. The switch 236 is closed manually in a manner and by means, including the start key 55, now to be described to start the motor 56.

Start key

When the start key 55 (Fig. 4) is depressed it closes the switch 236 (Fig. 29) to start the motor 56. The start key 55 has a stem 240 guided at its upper end in a plate 240a attached to the plate 76. The lower end of the stem 240 is pivotally connected by a headed pin 240b with a lever 241 to swing the latter by a pivot stud 242 on a bracket 243 secured to the base 71 of the main frame. The lever 241 has an ear 244 extending over a switch operating pin 245 to actuate the latter and thereby operate the contact spring 237 to close the motor switch 236.

Motor drive connecting

The lever 241 is also provided at its free end with a hook 246 (Fig. 4) normally engaging a pin 247 fixed to the free end of a gear sector 248 and extending through an aperture 247a in the side of gear 232. Said sector is pivotally supported by a stud 250 on the gear 232, and its clockwise movement relative to gear 232 is restrained by engagement with the gear collar 249, or the wall of the aperture 247a. A spring 251 is supported at one end by a stud 252 on the gear 232, the other end of the spring engaging in a notch 253 of the gear sector 248 to urge the latter in a counterclockwise direction (Fig. 4) about its pivot 250.

Upon the depression of the start key 55 the hook 246 is disengaged from the pin 247 to release the gear sector 248. Said sector is then swung about the pivot 250 and into engagement with the pinion 230 by the spring 251 thus effecting a driving connection of the shaft 58 with the pinion 230 of the motor drive. The diameter of aperture 247a limits the swing of sector 248 relative to pinion 230 and avoids jamming therewith.

The gear 232 is provided with a notch 254 in which the pinion 230 is normally located, said pinion being sufficiently wide to engage the gear 232 or the sector 248 but the pinion is out of engagement with the sector 248 and the gear 232 until after the motor is started. This gives the motor time to build up torque before the load of the shaft 58 is connected to the pinion 231 of the motor drive 57. After the sector 248 engages the pinion 230, the gear 232 is driven through the medium of the sector 248 until the teeth of the said gear engage the pinion 231 to rotate the shaft 58.

Motor switch closing and locking

At each actuation of the start key 55 the motor switch 236 is locked until the shaft 58 makes a cycle (single revolution). The lock is then released to open the switch. This closing is effected in the following manner. When the switch pin 245 is operated by the lip 244, it is locked, to hold the switch 236 closed, by a bell crank 255 (Fig. 29) which is actuated by a spring 256 about a pivot 255a to snap a hook 255b into a groove 255c in the pin 245. While the switch is thus locked the start key 55 may be returned to its normal position by a spring 257.

Motor switch release and stopping of general operator

As the shaft 58 nears the end of its cycle, a pin 258 on a collar 259 fixed to said shaft engages a lever 260 to actuate the latter about a pivot stud 261 extending from the side of the base plate 71. The forward end 262 of the lever 260 pushes upwardly on a pin 263 guided in the switch casing 239. The pin 263 cooperates with an arm 265 (Fig. 29) of the bell-crank 255 to actuate the latter to disengage the hook 255b from the switch operating pin 245 to permit opening of the switch 236 by the contact spring 237, to stop the motor 56.

The shaft 58 is then arrested at the end of its cycle by the hook 246 of the lever 241, which lever, in the mean time, has been returned to normal by its spring 257.

The opening of the motor switch 236 occurs after the notch 254 of the gear 232 arrived at the pinion 230 or in other words after the gear 232 runs out of mesh with said pinion 230. When the notch 254 arrives at the pinion 230 the gear sector 248 is still in mesh with the pinion 230 to drive the gear 232. As soon as the pin 247 of the gear sector 248 engages the nose 246, the gear sector 249 is moved out of mesh with the pinion 239 as in Fig. 4, thus disconnecting the shaft 58 from the motor drive 57.

A spring 269 has (Fig. 2), one end connected to a pin 270 on a disc 271 secured to the shaft 58, the other end of the spring being connected to a bracket 272 secured to the base plate 71. While the shaft 58 is in its normal position the spring exerts torque on said shaft (Fig. 2). The spring therefore insures that shaft 58 will make a complete revolution to return to the Fig. 2 position. It will also be noted that, upon the release of the shaft 58, effected by the depression of the start key 55 as above described, the spring 263 assists to expedite the motor torque to maximum and also in effecting the initial rotation of the shaft 58. After the motor exerts it full torque on the shaft, the assistance of the spring 263 is no longer needed, and during the continued rotation of the shaft towards normal position, the spring is again loaded by the motor while returning to the position in Fig. 2.

*Settable cam unit*

The shaft 58 is supported in the side plates 72 of the main frame and has supported thereon the cam unit 70 which is connected to said shaft by a key 273 (Figs. 23 and 39). Said unit includes an addition cam 274 (Figs. 23 and 39), which functions both for subtraction and total taking, a sub-total cam 276 (Figs. 12 and 39), a spring loading cam 277 (Figs. 3, 13 and 39) to bias the carry-over springs for addition, and a spring loading cam 278 to assist in effecting carry-over operations during subtraction. The cams are supported on a sleeve 279 (Fig. 39) the right end of which has a flange 279a. Discs 279b are provided between the various cams to separate them. The left end of the sleeve 279 is peened as at 279c to secure the cams in fixed relation with respect to each other and on said sleeve 279. The key 273 is secured to the sleeve 279 and engages in a key-way 279d, in the shaft 58, so that the cam unit 70 is caused to rotate with the shaft 58 and is free to slide axially thereon.

*Addition*

Normally the machine is set for addition and the cam unit 70 is set as in Figs. 8, 23 and 24 with the addition cam 274 in registry with a cam follower 280 supported on an arm 281 which is secured to a rock shaft 282 supported in the side plates 72 of the main frame. The follower 280 is normally held clear of the cam unit 70 as in Fig. 23 by a cam 283 (Figs. 8 and 23) fast on shaft 58 and engaging a nose 284a on the upper end of an arm 284 secured to the rock shaft 282 and located near the left end thereof.

When the general operator shaft 58 is caused to rotate due to the actuation of the start key 55, the cam 283 is rotated out of engagement with the arm 284. The follower 280 is then moved into engagement with a dwell position 287 of the addition cam 274 (Fig. 10) by a spring 285 (Figs. 23 and 24) connected to an arm 286 secured to the rock shaft 282. The operation of the cam 283 occurs during the early part of the rotation of the shaft 58 (counterclockwise, Fig. 23) as indicated by the curve A in the time chart (Fig. 49). As the rotation of the shaft 58 continues the follower 280 remains on the dwell portion 287 for about 90° rotation of the shaft as indicated by the curve C (Fig. 49). The follower then rides down a descending or fall portion 289 of the addition cam 274 until the shaft reaches approximately 130° of its rotation. The engagement of the fall portion 289 of the addition cam causes the accumulator 54 to be moved, through the medium of means hereinafter described, into cooperative relation with the active computing wheels. The follower then engages a low dwell portion 290 (Fig. 23) of the cam 274, where it remains for approximately 70° until the shaft has reached about 200° of its rotation. The follower 280 then engages an ascending or rise portion 291 of the addition cam to rock the shaft 282 back to its normal position and thus disengage the accumulator from the computing wheels and return it to normal. This operation starts at approximately 230° rotation of the general operator shaft and is completed at approximately 240°, see curve C (Fig. 49), at which time the high concentric position 287 of the addition cam reaches the follower 280, upon which the follower then rides. During the completion of a single rotation of the general operator shaft 58 the cam 283 actuates the arm 284 to rock the shaft 282 to move the follower 280 out of contact with the addition cam 274 as in Fig. 23.

*Actuation of computing wheel controlling bail*

While the follower 280 is riding on the dwell 287 of the addition cam during the early part of the rotation of the general operator shaft 58, the bail 59 is actuated by the cam 143 (Figs. 1 and 2) according to a curve B (Fig. 49). The cam 143 is secured to the left end of the general operator shaft 58 and is engaged by a follower 294 on a lever 295 pivoted on a stud 296 secured to the left side plate 72 of the main frame. The free end of the lever 295 is connected by means of a stud 297 to one end of link 298. The other end of the link is connected by a stud 299 to an arm 300 secured to the shaft 93 to which the computing wheel operating bail 59 is secured. The left arm 136 of the bail 59 has a downwardly projecting arm 301, see Fig. 34 also, having connected thereto one end of a spring 302 (Fig. 2), the other end of the spring being connected to an upwardly extending post 303 on the base plate 71. This spring tends to actuate the bail 59 forwardly of the machine, in a clockwise direction (Fig. 2). The follower 294 normally engages the concentric portion 304 of the cam against which it is held by the spring 302. After the general operator shaft 58 has rotated clockwise of Fig. 2 through approximately 40° (curve B, Fig. 49), the follower 294 engages a fall portion 305 of the cam 143 thus permitting the spring 302 to actuate the bail 59 in a clockwise direction (Fig. 2) and in a counterclockwise direction (Fig. 5) to its extreme forward position indicated in Fig. 40. It will be remembered that during this forward movement of the cross-bar 135 of the bail 59 the computing wheels are operated by their springs 69 until the active ones are arrested by their set index pins 53 which engage the stop bar 146. Before the forward movement of the bar 135 is completed the operation of the accumulator is started towards the computing wheels 51.

*Actuation of accumulator*

Figure 43:
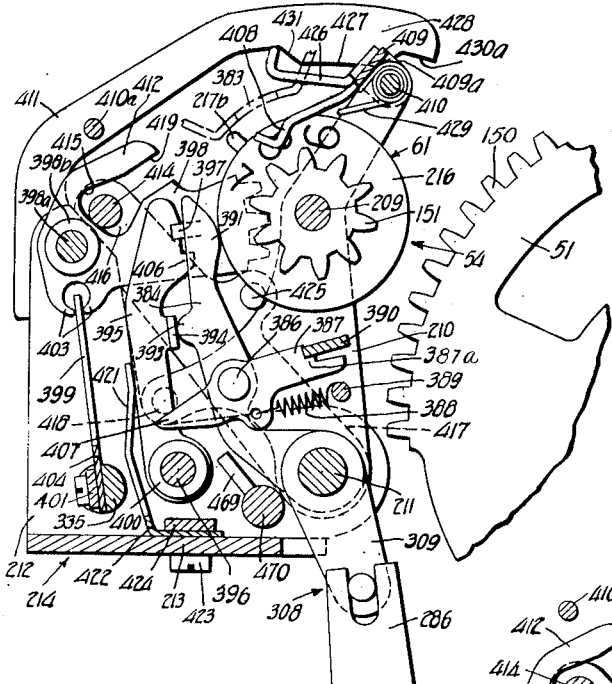
Fig. 43 is a side view in section of the accumulator and associated parts, showing the units dial wheel registering 8 at the sight opening and the computing wheel set at 5 which is to be added to 8 on the dial wheel.

To actuate the accumulator 54 or in other words move it into cooperative relation with the computing wheels 51, the arm 286 on the rockshaft 282 has a pin-and-slot connection 306 (Figs. 23 and 24) with an arm 309, see Fig. 43 also, secured to and extending downwardly from the shaft 211 of the accumulator frame. When the

17 follower 280 cooperates with the fall portion 289 of the addition cam 274, the rock-shaft 282 is rotated in a counterclockwise direction (Fig. 23) by the spring 285, and the arm 286 thereon actuates the arm 309 through the medium of the pin-and-slot connection 308, to thus rotate the rock-shaft 211 and thereby actuate the accumulator 54 to carry the dial wheel units 61 to the dot-and-dash line position shown in Fig. 40 where they engage the computing wheels 51 which are now in their operated positions.

While the low dwell 290 of the addition cam engages the follower 280, the accumulator is in its operated position. During this period of operation of the addition cam the bail 59 is returned from the position in Fig. 40 by means of the cam 140 (Fig. 2) against the action of the spring 302. While the bail 59 is being returned the cross-bar 135 thereof engages the abutments 138 of the computing wheels 51 to restore the latter to their normal position to rotate the dial wheel units 61 through distances equal in value to those of the set index pins 50. The set index pins 50 of the computing wheel 51 shown in Fig. 40 has a value of 8, thus the dial wheel cooperating with the said computing wheel has been rotated through 8 numeral positions to add 8 to the dial wheel 216 as in Fig. 41 by the return of the computing wheel 51. The accumulator is subsequently restored to normal during the engagement of the follower 280 with the receding position 291 of the cam.

It should be understood that during the addition operation the computing wheels 51 move idly from their normal positions until they are arrested by their set index pins 50 and that the dial wheels 216 are rotated by and upon the return movement of said computing wheels.

*Subtraction*

As previously stated the machine is normally set for addition and the addition cam 274 is in register with the cam follower 280 (Fig. 24). The subtraction key 67 when depressed actuates a key stem 310 (Figs. 23 and 24) which engages an arm 311 to rock a shaft 312 supported in arms 313 of a U-shaped bracket 314 secured to the underside of the plate 76 near its edge at the right side of the machine. The rock-shaft 312 is provided with an arm 315 having a pin 316 to engage the left side of the cam unit 70 to shift the latter axial of the shaft 58 against the action of a flat spring 317 secured at its upper end to the right side plate 72 of the main frame. Thus the subtraction cam 275 is shifted into register with the follower 280 (Fig. 37) and the addition cam 274 is shifted out of register therewith.

*Lock for subtraction key*

The subtraction key 67 is locked in its operated position by a plate 320 (Figs. 16 and 23) which is actuated, against the return of return spring 321, by a cam projection 322 on the front edge of the key stem 310. The key stem 310 is guided in slots in the plates 76 and 77 and passes through a slot 323 in the plate 320. The cam projection 322, during the depression of the subtraction key 67 engages the forward end 324 of said slot 323 to operate the plate 320 forwardly. When the cam 322 passes slightly beneath the plate 320 and spring 321 pulls said plate 320 back slightly toward normal position and over cam projection 322 thus locking the subtraction key 67 in its operated position. Consequently the cam unit 70 is maintained in its subtraction position (Fig. 37) until the subtraction key 67 is released by a subsequent forward actuation of the plate 320. This may be accomplished by means hereinafter described actuable by the shaft 58, or by depression of one of the keys 68 and 69. The locking plate 320 is guided in slots 325 of posts 326 suitably secured to the upper face of the plate 76.

After the number to be subtracted has been successively set up on the computing wheels 51, the start key 55 may be actuated to start the motor and also connect the shaft 58 therewith. During the initial part of the rotation of said shaft, the cam follower 280 is rendered effective and caused to engage a descending or fall portion 331 of the subtraction cam 275 (Fig. 11) for approximately 40 degrees of rotation of the shaft 58, see curve E of Fig. 49. A low dwell portion 332 of the cam 275 then reaches the follower 280. During this 40 degree rotation of the subtraction cam 275 the shaft 282 is rocked in a counterclockwise direction (Fig. 23) to cause the arm 286 to actuate the rock shaft 211 of the accumulator frame, in a clockwise direction, through the medium of the pin-and-slot connection 308 and the arm 309. The actuation of the shaft 211 moves the accumulator rearwardly into engagement with the computing wheels 51 as indicated in Fig. 41 while they are still in their normal positions. By comparing curves B and E (Fig. 49) it will be seen that during a subtraction operation the bail 59 starts operating forwardly after the accumulator cooperates with the computing wheels. During the forward movement of the bail 59 the computing wheels 51 rotate the dial wheel units 61 in a clockwise direction (Fig. 42) opposite to their rotation during an adding operation.

After the number is subtracted from the accumulator, the low concentric portion 332 of the subtraction cam 275 moves out of engagement with the follower 280 and an ascending or rise portion 333 engages the follower 280 to rock the shaft 282 in a clockwise direction of Fig. 23 to actuate the accumulator shaft 221 in a counterclockwise direction, through the medium of the arms 286 and 309 to restore said accumulator to its normal poistion.

After the accumulator 54 has been disengaged from the computing wheels the bail 59 is actuated by the cam 140 to return it to its normal position, see curves B and E (Fig. 49). During this movement of the bail the cross-bar 135 thereof causes the return of the computing wheels to their normal positions against the action of their springs 60. After the rise portion 333 of the subtraction cam passes the follower 280, the latter again rides on the high concentric portion 330.

*Release of subtraction key*

The release of the subtraction key is effected by the general operator 58 during the latter part of its rotation. To this end there is secured to the shaft 58 a cam 334 (Fig. 23) which engages a roller 335a of a lever 335b to actuate the latter about a shaft 335 upon which it is loosely supported. The upper end of the lever 335b is pivotally connected to an extension 335c on the locking plate 320 to push said plate forwardly when the lever 335b is actuated by the cam 334. When the plate 320 is so actuated it disengages the cam projection 322 to release the key stem 310 which is then restored to normal position by a spring 336. The latter acts on a head 336a of a stem 336b guided in the plate 76. The head 336a has a slot 336c into which extends a projection 336d of the subtraction key stem 319, said projection engaging under the plate 77 to arrest the subtraction key 67 in normal position.

Following the release of the subtraction key 67 the cam unit 70 is returned to its extreme left position (Fig. 24) by the spring 317 in which position of said cam unit addition may again be performed.

*Printing*

Figure 20:
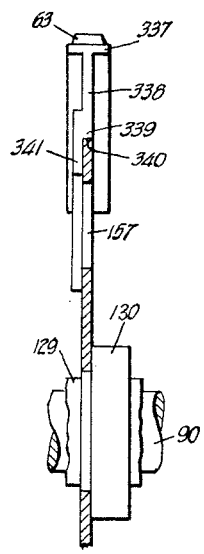
Fig. 20 is a sectional view taken on the line 20—20 of Fig. 5, illustrating the assembly of the type unit on the computing wheel.

The types 63 on each computing wheel have numerals thereon from 0 to 9 corresponding to the values of the index pins 50. These types 63 are provided on a curved plate 337 (Fig. 40) formed on the outer face of a segmental plate 338 having a shoulder 339 (Fig. 20) to seat against an outer curved surface 340 of the computing wheel 51. The segmental type plate 338 also includes an off-set portion 341 (Fig. 20) extending down along the side of and fastened to the computing wheel 51.

To print the number, whether added or subtracted, the numeral types 63, corresponding to the digits of the number being computed are registered at a printing line when the computing wheels are arrested by the set index pins 50, as previously stated. The platen 62 is then swung forwardly to print the number through the medium of a suitable ribbon (not shown) which may be interposed between the register types and the platen. It will be understood that the conventional two-color ribbon and ribbon shift mechanism may be employed, together with the usual type for abbreviating "total," "sub-total," etc.

The platen 62 is operated by a cam 343 on the disc 271 (Fig. 2) fast on the shaft 58. Said disc has, except for cam 343, a concentric surface against which a follower 344 of a link 345 normally bears. During the rotation of the disc 271 by the shaft 58, see curve G of Fig. 49 also, the cam 343 engages the follower 344 to push link 345 (Fig. 2) rearwardly. The rear end of the link 345 is connected by a stud 346 to a lever 347 to rock the latter in a counterclockwise direction, against the action of a return spring 347a, about a stud 348 fixed to the side plate 72. The upper end of the lever 347 has a pin-and-slot connection 349 with the lower end of an arm 350 of a platen frame 351 carrying the platen 62 at its upper end by means of a platen shaft 352. The platen frame 351 is pivotally supported on the main frame by means including studs 353 one at each side of the machine. Thus it will be understood that when the lever 347 is actuated by the cam 343 the platen frame 351 is swung about its pivot 353 to carry it forward to print against the registered types 63. As soon as the cam 343 passes the follower 344, the platen frame is swung back to its normal position by the spring 347a and is arrested in its normal position by a stop 355 on the platen frame 351 engaging an ear 356 formed on the side plate 72.

It will be seen by an inspection of curve G of the time chart (Fig. 49), that the printing cam 343 becomes active at about 100° rotation of the general operator shaft 58, that the follower 344 and platen 62 are completely operated when the general operator shaft reaches approximately 120° to effect the printing, and that the follower is returned to the low part of the cam at approximately 140° of rotation of the shaft. The printing always occurs at the same position in the cycle of operation of the general operator shaft irrespective of whether addition or subtraction is being performed.

By a further inspection of the time chart it will be seen that during an addition operation the printing occurs before the dial wheel units are rotated by the computing wheels, and that during a subtraction operation, the printing takes place after the dial wheel units have been rotated by the computing wheels. It will be understood, however, that under both conditions, addition and subtraction, the active computing wheels are in their operated positions, having been arrested by their set index pins 50 engaging the stop bar 143 to thus register the types to be printed at the printing line.

The numerals 0 of the computing type wheels 51 normally register at the printing line and when the number being computed has an 0 digit the 0 index pin 50, which normally registers with the front edge of the stop plate 143, is set. Consequently when the cross-bar 135 of the bail 59 is operated forwardly the computing wheel having its 0 pin set is not actuated because it is held by its set pin. Accordingly the 0 numeral which is normally at the printing line will be printed when the platen is operated.

After the number has been indexed the computer carriage overlaps the accumulator by as many computing wheels 51 as there are denominational positions in the number, or in other words by as many computing wheels as are active and that the inactive computing wheels to the right of the active ones are also rotated, but idly, during a computing and type positioning operation of the active computing wheels. This rotation of the idle computing wheels is caused by their springs 60 when the cross-bar 135 of the bail 59 is moved forwardly.

Provision is made, however, to prevent printing of any of the types of the idle computing wheels. To this end the abutments 139 of the idle computing wheels remain in contact with the cross-bar 135 to its forward position (Fig. 40) thus carrying all of their types beyond or above the printing line so as not to be engaged by the platen during a printing operation.

*Repeat mechanism*

The repeat key 65 has a stem 360 (Figs. 1, 23 and 24), which is guided in the plate 77 and a fixed bracket 360a. Said key may be operated before or after the number is indexed on the computing wheels 51, but prior to the actuation of the start key 55. Upon the depression of the repeat key 65 a shoulder 361 on the key stem 360 is snapped under the plate 77 by a spring 362 which causes the upper end of the key stem 360 to move forwardly in a guide slot 363 in the plate 77, to thus lock the repeat key 65 in its depressed position. The release of the repeat key 65 may be effected by pushing the key rearwardly at will to disengage the shoulder 361 from the plate 77 whereupon said key may be restored to normal.

During the depression of the key stem 360 its lower end engages one end 364 of the lever 365, see Fig. 25 also, to actuate the latter about a pivot stud 366 on a bracket 367 secured to the base plate 71. The other end, 368, of the lever 365 engages under an extension 369 of a bar 370 to tilt the latter in a counterclockwise direction (Fig. 25) about its edge 371. The bar 370 is constrained by brackets 372 secured to the base plate 71 and is provided with a bifurcated end 373 having fingers 374 to engage under the cam 204 to lift the cam against the action of a return spring 375 (Fig. 26), to its position shown shown in dot-and-dash lines out of cooperative relation with the follower 203 on the carriage return lever 194. The cam 204 is held in its raised position until the repeat key 65 is released. The release of the key 65, it will be remembered, is effected by pushing it rearwardly to disengage the shoulder 361 from the plate 77. When this occurs the spring 375 returns all of the parts from the cam 204 to and including the key stem 360 to normal position.

The cam 204 is normally held in its lower position by the spring 375 and is driven by a bevel gear 376 (Fig. 26) secured to the shaft 58. The gear 376 meshes with a bevel gear 377 having a hub 378 by which it is supported on a stud 179 secured to the base plate 71. The cam 204 has a hub 380 by which said cam is slidingly supported on the gear hub 378. A key 381 between the hubs 378 and 380 connects the cam 204 to the gear 377.

It will be remembered that during the setting of the index pins 50 the carriage is caused to feed one step at a time into overlapping relation with the accumulator 54, and that after each computing operation the cam 204 returns the carriage 52 to the right side of the machine (Fig. 8), thus clearing the computing wheels 51, or in other words restoring the set index pins 50 by means of the wiper cam 64 (Fig. 19). While the cam 204 is held in its upper position by the repeat key 65, it is clear of the follower 203, and free to rotate without actuating the carriage return lever 194; the carriage remains in overlapping relation with the accumulator and consequently the index pins set on the computing wheels are not disturbed and the number corresponding to the set index pins may be transferred to the dial wheels at each repeated actuation of the start key 55.

To prepare the machine for non-repeat the computer carriage is moved to the extreme right and repeat key 64 unlatched manually by disengaging the shoulder 361 from the plate 77, thus permitting the parts operated thereby, including the cam 204, to be returned to their normal positions by the spring 375. The machine is now in condition to receive a new number for computation.

*Carry-over (addition)*

The carry-over mechanism is illustrated principally in Figs. 21, 22, 28, 43, 46 and 47, and includes the carry-over elements 217, one on each dial wheel unit 61, as previously described. Assuming that a dial wheel 216 registers "8" at the sight opening 383 (Fig. 43), its carry-over finger 217b occupies the position indicated in full lines. In the event that "2" is then added to the dial wheel, the carry-over finger initiates a carry-over operation to the next adjacent dial wheel 216 of higher denominational order. In other words, the carry-over fingers of the dial wheels carry over to the adjacent dial wheel according to the settings of the dial wheels at the time of addition.

The rock-shaft 211 of the accumulator 54 has loosely supported thereon carry-over elements or levers 384, there being one for each dial wheel. These levers are held in spaced relation, by hubs 385 (Fig. 27), on the shaft 211. Each carry-over lever 384 has a stud 386 upon which a latch 387 is pivotally supported, each latch being normally urged in a counterclockwise direction (Fig. 43) by a spring 388, one end of which is connected to the latch 387, the other end being connected to a rod 389 supported by the side plates 210 of the accumulator frame. The springs 388 also urge the carry-over lever 384 in a clockwise direction about the shaft 211, but they are arrested by the latches 387 which engage a cross-bar 390 supported by and secured to the two arms 210 of the accumulator frame. Thus each lever 384 is normally biased toward the outer surface of the associated computing wheel so that a cam 391 formed on its upper end will be engaged by the carry-over finger 217b. The cam 391 is normally close to the face of the associated dial wheel 216, but out of contact therewith.

Figure 44:
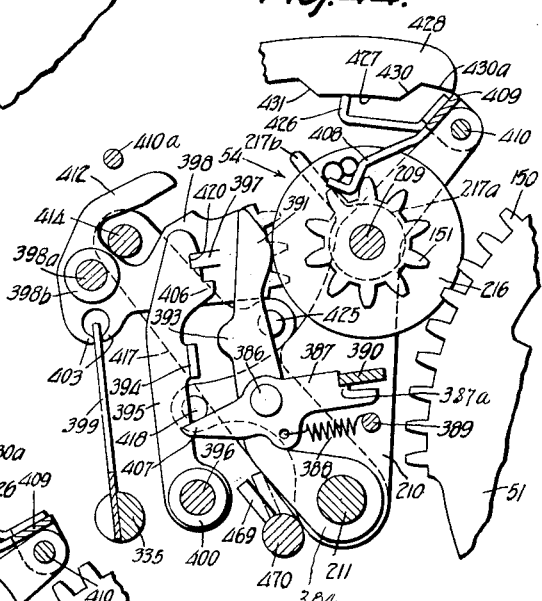
Fig. 44 is a view similar to Fig. 43 showing the dial wheels locked while the accumulator is in transit to the computing wheels.

While the dial wheel units 61 are in transit to the computing wheels 51, the carry-over levers 384 follow and swing about the axis of the accumulator supporting shaft 211, as indicated in Fig. 44. A pin 392a on the accumulator frame finally engages a stop 392 (Fig. 2) to arrest the pinions 151 of the dial wheel units 61 in proper engagement with the racks 150 of the computing wheels 51 which, it will be remembered, during an addition operation are in their operated or forward positions, and rotate the connected dial wheels, in a counterclockwise direction, during their return movement as indicated in Fig. 45.

Figure 45:
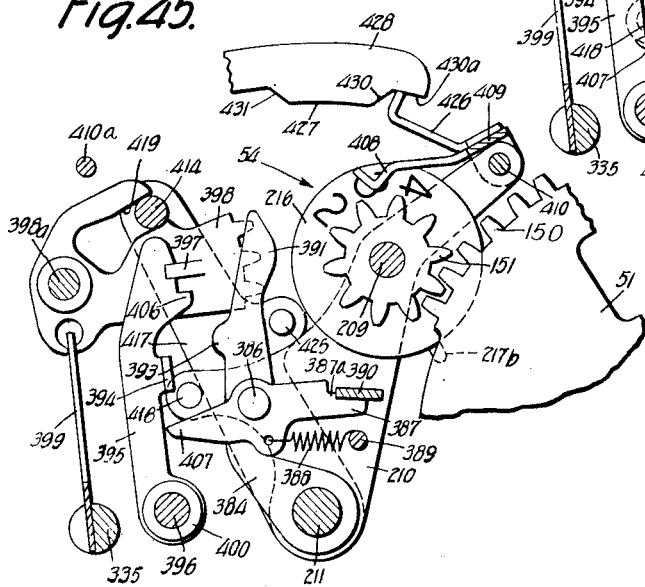
Fig. 45 is a view similar to Fig. 44 showing the dial wheel rotated by the computing wheel to add the 5, thus causing 3 to register at the sight opening and a carry-over device operated to initiate a carry-over operation to the dial wheel of next higher denominational order.

During the counterclockwise rotation of the dial wheel 216 the carry-over finger 217b engages the cam 391 of the associated carry-over lever 384 to actuate the latter in a counterclockwise direction about the shaft 211 to a position slightly further than that shown in Fig. 45, thus permitting a shoulder 387a on the latch 387 to snap behind an edge of the bar 390 by the action of the spring 388 and thus lock the carry-over lever 384 in its operated position (Fig. 45).

Figure 46:
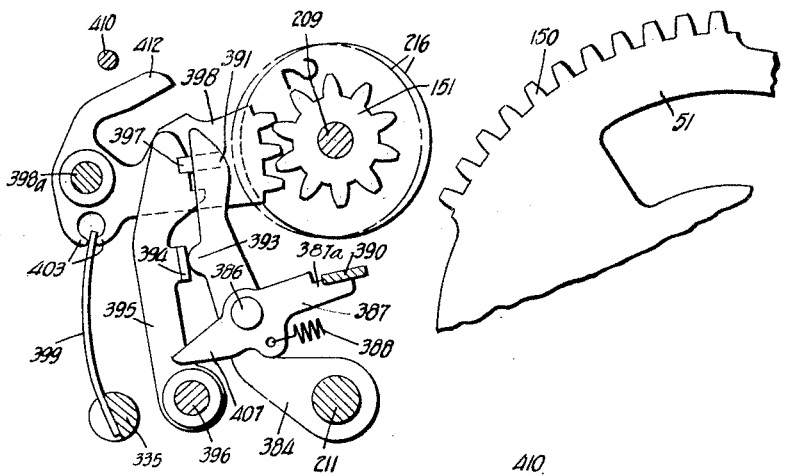
Fig. 46 is a view showing a carry-over sector about to be released to effect a further step of the carry-over operation.
Figure 47:
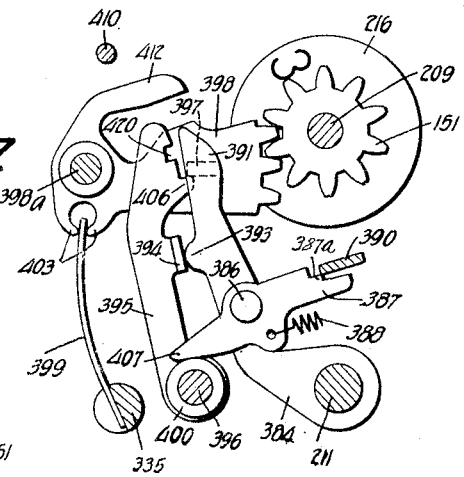
Fig. 47 is a view showing the completion of the carry-over during an addition operation, the dial wheel having been rotated from the "2" position in Fig. 46 to the "3" position.

While the carry-over lever 384 is locked in its operated position and during the return of the accumulator to its normal position, a projection 393 on the carry-over lever 384 engages a lip 394 of a locking lever 395 as shown in Fig. 46, before the accumulator has been completely restored to normal position. Upon further movement of the accumulator (Fig. 47), the locking lever 395 is actuated in a counterclockwise direction about a stationary supporting rod 396 to disengage the upper end of the lever from a lip 397, see Fig. 27 also, of a carry-over sector 398, thus permitting the sector to be operated by means to be described including a spring 399. The carry-over sector 398 is operated from its normal position (Fig. 46) to the position in Fig. 47, in a clockwise direction about a supporting rod 398a to thus complete the carry-over operation from one dial wheel 216 (Fig. 43) to the one of next higher order (Fig. 47). The rod 398a is supported by the end plates 212 of the fixed frame 214 and the sectors 398 are spaced from one another on said rod by collars or hubs 398b. The locking levers are spaced from each other on the rod 396, which is supported at its ends in the side plates 212 of the accumulator supporting frame, by hubs or collars 400. One carry-over sector 398 is provided for each dial wheel pinion 151, except the one of lowest denominational order, the latter being provided with an element 400a (Figs. 4, 21 and 22) which may be similar to the sectors 398 but is secured to the rod 398a and serves only to prevent accidental rotary displacement of the dial wheel 216 of the lowest order while the accumulator is in its normal position.

Springs to actuate the carry-over sectors

The spring fingers 399 extend from a body-part 401 and each finger engages between fingers 403 of the sectors 398. The spring carrying body-part 401 is secured to the rock-shaft 335 pivotally supported in the end plates 212 of the accumulator supporting frame and the right side plate 72. This rock-shaft 335 may be actuated in either direction by suitable spring biasing means, hereinafter described, but during an addition operation the shaft is actuated from its normal position (Fig. 43) in a counterclockwise direction to bias the springs 399 as in Fig. 46 so that they tend to rotate the carry-over sectors 398 about the supporting bar 398a in a clockwise direction. From this it will be apparent that when one or more of the sectors 398 are released from their locking levers 395, biased by springs 421, the associated dial wheel units 61 are rotated in a counterclockwise direction to complete the carry-over operation from one dial wheel 216 to the next one of higher order.

Each carry-over sector 398, when operated during an addition operation, is arrested by a shoulder 406 on the locking lever 395, said shoulder being engaged by the lip 397 of the carry-over sector 398, as in Fig. 47.

Toward the end of the return movement of the accumulator to normal position each effective latch 387 is released from the bar 390 by a tail 407 which engages the hub or collar 406 to actuate the latch in a clockwise direction about its pivot 386 until the shoulder 387a is out of engagement with the front edge of the locking plate 390. The spring 388 then restores the carry-over lever 384 with its latch 387 to normal position (Fig. 43).

The spring biasing shaft 335 is then returned to its normal position, thus there is a tendency of the spring associated with the operated carry-over sector 398 to return the latter to normal. This is prevented, however, by means of a detent 408 which is caused to engage between two of the teeth of the dial wheel pinion 151 as shown in Figs. 2 and 4, where it is held, by means hereinafter described, after the carry-over operation has been completed. There is one detent 408 for each dial wheel extending from a bar 409 pivoted by ears 409a on a rod 410 supported by the upper ends of the side plates 210 of the accumulator frame.

Carry-over (subtraction)

Figure 48:
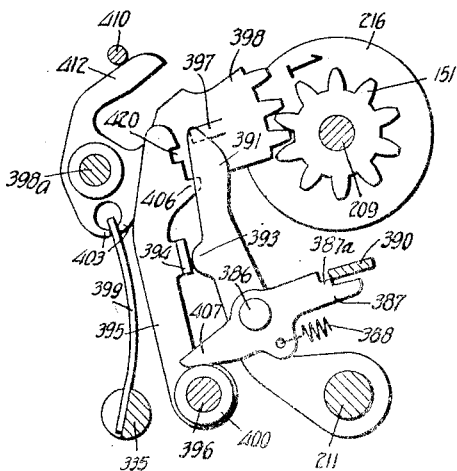
Fig. 48 is a view similar to Fig. 47, showing the completion of a carry-over during a subtraction operation, the dial wheel having been rotated from the "2" position in Fig. 46 to the "1" position.

To effect the carry-over during subtraction, the operation is similar to that described for addition. It will be remembered, however, that during a subtraction operation the dial wheels 216 are rotated in a direction (clockwise in Fig. 43) opposite to that for addition. The rock-shaft 335 is actuated from its normal position (Fig. 43) in a clockwise direction to bias the springs 399 in a direction opposite to that described for addition carry-over operations so that said springs tend to actuate the carry-over sectors in a counterclockwise direction about the rod 398a. Upon the actuation of any one of the locking levers 395, the associated released sectors 398 is operated by its associated spring 399 as in Fig. 48 to thus complete a subtraction carry-over operation.

To arrest any one of the carry-over sectors 398 in its operated position during a subtraction operation there is provided a limiting stop rod 418a (Figs. 43 and 48) supported by arms 411 secured to the upper ends of the side plates 212 of the frame 214. The stop rod is engaged by a member 412 of the carry-over sector. The detents 408 are again locked in engagement with the pinions 151 to prevent rotation of the dial wheels 216, which may otherwise be caused by the springs 399 upon the return of the shaft 404 to its normal position.

Means to align the carry-over sectors

The operated carry-over segments 398 remain in their operated positions until the next computing operation, when the accumulator 54 is again actuated to carry the dial wheels 216 to the computing wheels 51. As soon as the pinions 151 disengage the operated sectors 398, which have previously effected carry-over operations, whether for addition or subtraction, they are returned toward their normal positions by the springs 399. Provision is made, however, to insure aligment of the carry-over sectors. To this end there is provided a bar 414 (Fig. 43) which is normally located in the wide ends 415 of slots 416 in the carry-over sectors 398. Said bar is carried by the upper ends of arms 417 pivotally supported on the shaft 211, see Figs. 21 and 22 also. After the accumulator 54 has been moved rearwardly sufficient to disengage the pinions 151 from the operated carry-over sectors 398, studs 418, on the end plates 210 of the accumulator frame, engage the arms 417 to actuate the latter in a clockwise direction (Fig. 43) and thus carry the bar 414 therewith and cause it to engage in the narrow parts 419 of the slots 416 in the carry-over sectors 398 to thus align them. The bar 414 is brought to rest (Fig. 45) while located in the narrow portions 419 of the slots 416 and when the carry-over pinions 151 are in engagement with the racks 150 of the computing wheels 51.

Upon the return movement of the carry-over sectors 398, their lips 397 re-engage slots 420 at the upper ends of the locking levers 395, said locking levers being urged toward said lips 397 by springs 421 extending upwardly from a plate 422 secured to the cross bar 213, of the frame 214, by screws 423 threaded into a bar 424. To return the aligning bar 414 to normal in the large ends 415 of the slots 416, the side plates 210 of the accumulator frame engage studs 425 on the arms 417 to carry the bar out of the slot portions 419 to the position in Fig. 43. The slot portions 415 are enlarged to provide clearance for the bar 414 so that the carry-over sectors 398 may be set in either direction about the supporting bar 398a without interference by the aligning bar 414.

Dial wheel detents

Provision is made to lock the dial wheel units 61 against accidental rotation while they are in transit back and forth between the carry-over sectors 398 and the computing wheels 51. To this end there is employed the detent bar 409 (Figs. 21, 22 and 43) which, it will be remembered, is supported on the rod 410 of the accumulator frame. The detent fingers 408 normally engage the dial wheel pinions 151 as indicated in Fig. 4.

During the greatest part of the operation of the accumulator from its normal position, the detent fingers 408 are held in their effective position by an arm 426, on the detent bar 409, which is caused to engage a dwell 427 of a cam 428 formed on one of the arms 411, by a spring 429. The arm 426 continues on the dwell 427, as indicated in Fig. 44, until it reaches the end thereof, and it then rides upon a cam portion 430, due to the influence of the spring 429 to disengage the detents 408 from the dial wheel pinions 151 after the latter are in mesh with the racks 150 of the active computing wheels. The dial wheels 216 may then be rotated by the computing wheels 51. After the finger 426 moves out of engagement with the cam 430 it engages a dwell 430a to arrest the detents 408 in their released positions (Fig. 45).

Upon the return movement of the accumulator 54, the finger 426 engages the cam 430 to swing the detents 408, against the action of the spring 429, into locking engagement with the dial wheel pinions 151, before they disengage the racks 150 of the computing wheels. The detents are held in this position until the finger 426 reaches a cam position 431 which causes the detents to again move out of engagement with the pinions 151 so that the carry-over operations may be completed by the carry-over sectors 398.

*Locking of idle dial wheels in operated position of accumlator*

Provision is made to lock the idle dial wheels at the left of the accumulator when the denominational position of the number being computed is less than the number of dial wheels 216 in the accumulator 54, in other words to lock the inactive dial wheels to the left of those connected with the computing wheels while the accumulator is in its operated position and after the detents 408 have been released from the pinions 153, as in Fig. 45, of all of the dial wheels. To this end there is extending leftwardly from the left end plate 126 of the computer carriage frame 124 a fixed detent element 432 (Fig. 1). Said detent element comprises a base 432a secured to the plate 126 and from which base extends a bar 433. Fingers 433a project forwardly from the bar 433 to extend between the dial wheels 216 when the accumulator is in its operated position. The free end of each finger has a V-shaped groove 433b (Fig. 2) into which a tooth of pinion 151 extends during the latter part of the movement of the accumulator towards the computing wheels. Thus accidental rotation of the inactive dial wheels 216 is prevented while the accumulator is in its operated position and after the detents 408 are in their released position as in Fig. 45.

Figure 21:
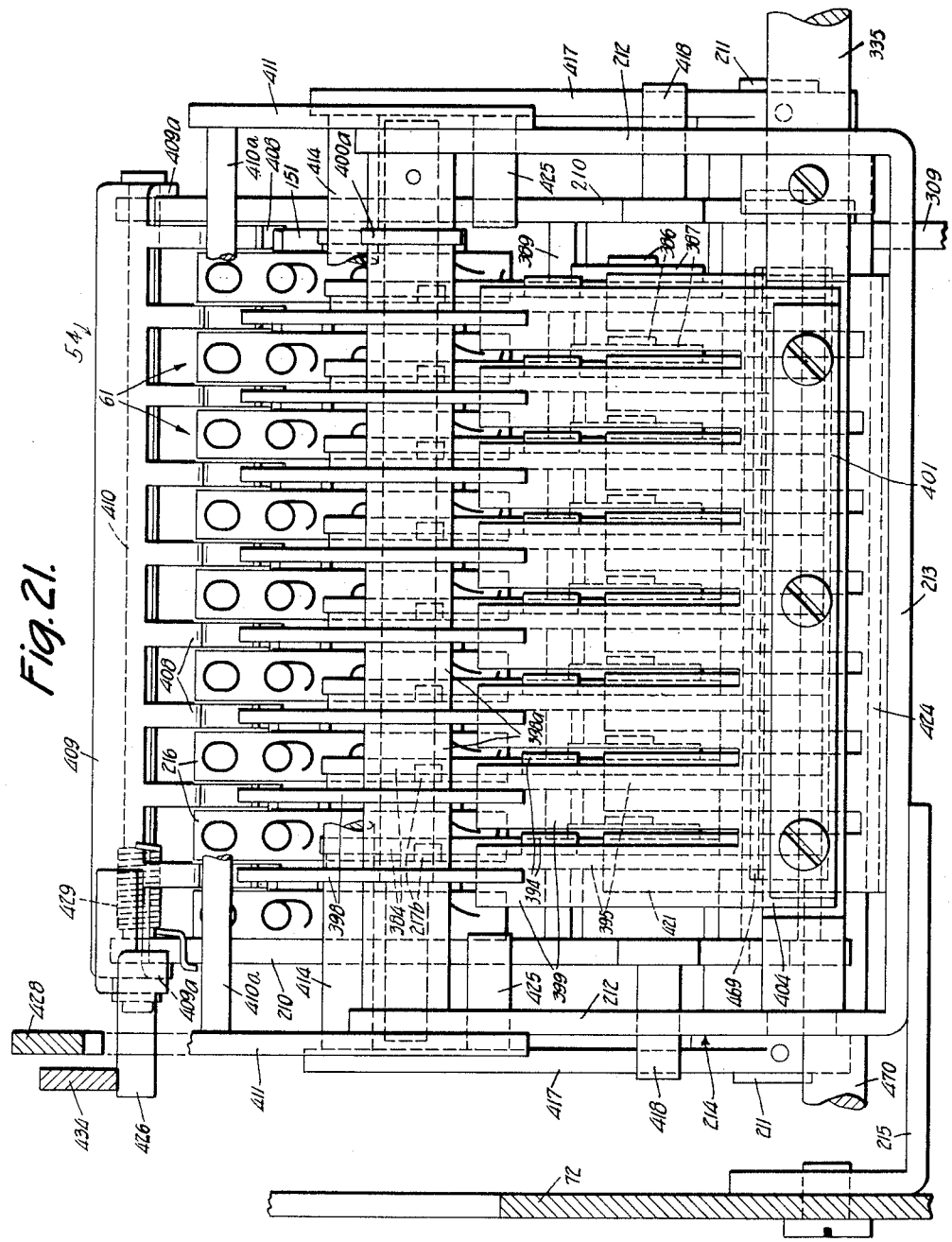
Fig. 21 is a front elevation of the accumulator and some of its associated parts.
Figure 22:
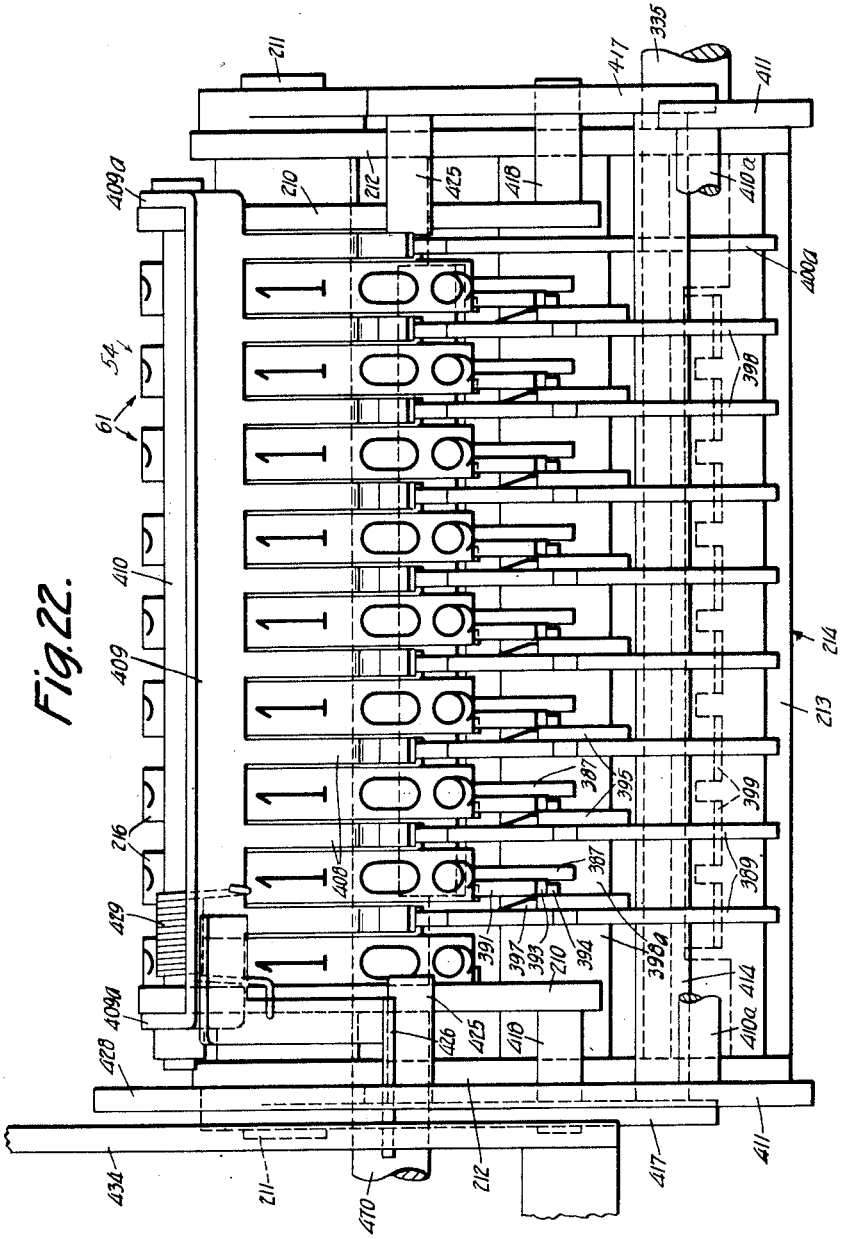
Fig. 22 is a plan view of Fig. 21.

In Fig. 1 it will be seen that there are as many fingers 433a as there are dial wheel pinions 151 which are located at the right of their dial wheels 216 as in Figs. 21 and 28. Consequently if for any reason the general operator shaft 58 is caused to cycle while the computer carriage is in its extreme right position, all of the fixed detent fingers 433a cooperate with all of the pinions 151 to lock the dial wheels 216 in the operated position of the accumulator 54 when the general operator shaft 58 is cycled, the dial wheels 216 to the left of the computer carriage are locked by the fixed detent fingers 433a.

*Lock for dial wheel detents*

As previously stated, the spring loading shaft 335 is restored to its normal position (Fig. 43) after each carryover operation, which, it will be remembered, occurs after the accumulator has been returned to its normal position, and there is then a tendency on the part of the springs 399 associated with the active carry-over sectors 398 to restore the sectors. This action of the carry-over sectors is prevented, however, since it would otherwise cancel the carry-over previously effected thereby. To this end there is provided at the left side of the machine, a lever 434 (Figs. 1 and 2) pivotally supported on the carriage guide rod 74. This lever has connected thereto a spring 435 which causes the free end of said lever to bear against a concentric portion 436 of a cam disc 437 secured to the shaft 58.

While the shaft is in its normal position, a shoulder 438 of the lever 434 engages the finger 426 of the detent bar 409 to hold the latter in its actuated position as in Fig. 5, to thus lock the dial wheels through the medium of the detent fingers 408 which engage the pinions 151. The shoulder 438 of the lever 434 is co-extensive with the dwell 427 and during the initial part of the movement of the accumulator 54 towards the computing wheels, the finger moves from the shoulder 438 to the dwell portion 427 of the arm 411. Thus the dial wheels 216 are locked against actuation in their normal position and consequently the sectors 398 are also locked. The latter remain in locked position until the pinions 151 become disengaged from their associated carry-over sectors 398 during a subsequent operation of the accumulator 54 towards the computing wheels 51.

After the finger 426 engages the dwell 427, the lever 434 is operated by an ascending or rise portion 439 of the cam disc 437 to raise the shoulder 438 out of the path of the finger 426. The lever 434 then rides on a dwell portion 440 of the cam disc 437 and remains there until after the accumulator is restored to its normal position and the carry-over operations have been effected, the finger 426 being at this time in the position shown in Fig. 43, and the detents 408 are free of the dial wheel pinions 151.

After the carry-over operations have been completed the rotation of the general operator shaft 58 continues and the lever 434 engages a receding or fall portion 441 of the cam disk 437 to permit the return of said lever to its normal position by its spring 435. During the return of the lever 434 its shoulder portion 438 engages the finger 426 to swing the detents 408 into locking engagement with the dial wheel pinions 151. This operation occurs after the carry-over sectors 398 have been operated to complete the carry-over operations and before the springs 399 have been restored to normal.

*Loading of carry-over springs for addition*

To bias or load the springs 399 for the carry-over sectors 398 during an addition operation, there is provided the cam 277 (Figs. 3, 13, 23, and 24) which, as previously mentioned, is part of the cam unit 70. While the cam unit 70 is in its addition position (Fig. 24) the cam 277 registers with a follower 445 on an arm 446 secured to the spring biasing shaft 335. At a certain time during the cycle of the general operator shaft 58, see curve D (Fig. 49), the cam 277 engages the follower 445 to actuate the shaft 335 in a counterclockwise direction (Figs. 3 and 23) to thereby bias the springs 399 thereon as indicated in Fig. 46, so that they tend to rotate their associated carry-over sectors 398 in a clockwise direction. Only those carry-over sectors which have been previously released from their locking levers 395 are actuated by the springs 399 to complete the carry-over operation as previously described.

*Loading of carry-over springs for subtraction*

When the cam unit 70 is shifted to perform subtraction (Fig. 37), the cam 278 is registered with a follower 447 on an arm 448 secured to the shaft 335. During a subsequent cycle of the general operator shaft 58, see curve F (Fig. 49), the cam 278 engages the follower 447 to actuate the shaft 385 in a counterclockwise direction and thus bias the springs 399, as in Fig. 48, so that said springs tend to rotate their associated carry-over sectors 398 in a counterclockwise direction. Consequently the released carry-over sectors 398 are actuated by their springs 399 to rotate the associated dial wheels 216 in a clockwise direction to complete the subtraction carry-over operations.

All of the springs 399 except those engaging active carry-over sectors 398 resume their straight condition after the cams 277 and 278 are returned to normal. Consequently the springs associated with the inactive carry-over sectors restore the shaft 335 with its arms 446 and 448 to their normal positions (Fig. 8).

*Total taking*

As previously stated, the total may be taken by depressing the total key 68 (Figs. 1 and 23). This key is secured to the upper end of a key stem 453, see Fig. 24, also, the lower end of which engages an arm 454 secured to the shaft 312 to actuate the latter and cause the arm 315 and its pin 316 to slide the cam unit 79 axially of the shaft 58 from its normal, addition position to its subtraction position (Fig. 37) or, in other words, register the subtraction cam 275 with the cam follower 286.

*Release and positioning of computer carriage for total taking*

During the operation of the total key 68, the computer carriage 52 is released from the escapement 53 in a manner to be described, and is urged leftwardly by the means including the lever 194 (Fig. 8), until arrested by a stop 455 (Fig. 34) so as to register the computing wheels 51 with the dial wheel pinions 151, the computing wheel to the extreme left registering with the dial wheel pinion of highest denominational order, and the other computing wheels registering successively with the pinions in descending denominational order.

To effect the release of the carriage, the key stem 453 has on its lower end a pin 456 (Figs. 23 and 24) which engages a lip 457 of a lever 458 secured to a rock-shaft 459, the latter being supported in ears 460 of a bracket 461 secured to the base plate 71 of the main frame. The lever 458 is actuated by the pin 456 to rock the shaft 459 in a clockwise direction (Fig. 23), to actuate an arm 462 secured to the shaft 459. The arm 462 has a pin 463 engaging under a lever 464, loosely supported on the shaft 459, to hold said lever in its normal position. The lever 464 is held axially of the shaft between the arm 462 and a fixed collar 462a. Said lever extends rearwardly of the machine and its rear end 466 extends over a tail 467 of the loose dog 184. While the arm 462 is being actuated the pin 463 moves downwardly to permit the lever 464 to be actuated by a flat spring 468 said spring being secured to the left side plate 72 (Fig. 24) of the main frame. The lever 464 actuates the loose dog in a counterclockwise direction about its pivot 189, as in Fig. 36, to move the nose 188 thereof out of engagement with the rack tooth 185, thus releasing the carriage, which is then moved to its extreme left position against the stop 455, by the spring 197, lever 194, and link 201.

A return spring 471 (Figs. 2 and 8) is connected to an arm 472 secured to the rock-shaft 459 and tends to return the latter and the carriage release lever 464 to their normal positions. This is prevented, however, by the total key stem 453, which is locked in its operated position by a cam nose 473 similar to the nose 322 on the subtraction key stem 310, the nose 473 also engaging under the plate 320 to lock the total key 68 until the shaft 58 has almost completely cycled, when the locking plate is operated by the cam 334 on the shaft 58, as previously described, to release the total key 68.

Simultaneously with the setting of the cam unit 70 and the release of the carriage, by the total key 68, there is rendered effective a locking bar 469 (Figs. 21 and 43), see also curve L of Fig. 49, associated with the carry-over levers 384. This bar 469 is secured to a rock-shaft 470 supported in the side plates 212, of the fixed frame 214 which supports the accumulator 54. During the regular addition and subtraction operations, this bar 469 is in an ineffective position, shown in full lines in Fig. 43, but upon the actuation of the total key, it is rendered effective, as shown in dot-and-dash lines (Fig. 44), to lock all of the carry-over levers 384.

*Locking of carry-over lever for total taking*

To render the locking bar 469 effective the rockshaft 459 has loosely supported thereon a rearwardly extending arm 474 located between the ear 460 of the bracket 461 and a collar 474a secured to the shaft 459 (Figs. 1, 2, and 8). The arm 474 has at its free end a nose 475 to engage a lip 476 of a lever 477, secured to the left end of the rockshaft 470. A spring 478 is connected to the lever 477 and urges it in a counterclockwise direction in Fig. 2. Upon the release of the nose 475 from the lip 476, which is effected in a manner now to be described, the spring 478 actuates said lever 477 to rock the shaft 470 and actuate the bar 469 to lock the carry-over levers 384 as previously stated.

To release the lever 477 from the holding arm 474 there is secured to the rock-shaft 459 an arm 479 (Figs. 2 and 8) upon which there is pivotally supported a trip lever 480 by a stud 481. The trip lever 480 has an arm 482 normally held against a stop pin 483, on the arm 474, by a spring 484. The lower end of the arm 482 engages a lip 485 on the arm 474 so that upon the actuation of the arm 479 the arm 474 is actuated through the medium of the arm 482 until the nose 475 is clear of the lip 476 on the bar actuating lever 477, the arm 474 being actuated against the action of a return spring 486. After the nose 475 releases the lever 477, the free end of another arm 487 of the trip lever 480 engages a fixed stop 488 to thus rock said trip lever about its pivot stud 481 to disengage the arm 482 from the lip 485 to release the arm 474 so that it may be actuated by its spring 486 to cause the nose 475 to snap behind the lip 476 as soon as the actuating lever 477 is returned to its normal position, this return of the lever 477 being effected independently of the shaft 459 and during the latter part of the cycle of the shaft 58, by means of a cam 489, secured to the shaft 58 (Fig. 2), engaging a follower 490 on the lever 477. Upon the return of the lever 477 to normal the nose 475 of arm 474 snaps behind the lip 476 to hold the lever 477 in its normal position.

Upon the return of the shaft 459, which does not take place until the total key 68 is released, the arm 482 of the trip lever 480 snaps over lip 485 of the arm 474 and engages the stop pin 483.

While the total key 68 is locked in its operated position, the locking bar 469 is effective and the carriage 52 is in its extreme left position, the start key 55 may be operated to cause the general operator to function to actuate the accumulator into engagement with the computing wheels 51, all of their index pins 59 being at this time in their normal or ineffective positions. The bail 59 which normally holds the computing wheels 51 in their normal positions is then moved forwardly, thus permitting said computing wheels 51 to be rotated by their spring 60 to rotate the active dial wheels 216 in a clockwise direction (Fig. 43) until the carry-over fingers 217b engage the cam portions 391 of the carry-over levers 384 which are now locked by the bar 469. Consequently, the dial wheels 216 are arrested in their 0 position and accordingly, the number or total previously registered by them has been subtracted therefrom and transferred to the computing wheels 51, the types 63 of which now register the total at the printing line. The platen is then caused to cooperate with the registered types to print the total.

When the dial wheels 216 are in their 0 positions and the accumulator is in engagement with the computing wheels, the carry-over fingers 217b engage the lower ends of the cam 391 of the carry-over levers 384. Consequently the the inactive dial wheels 216 or, in other words, the dial wheels to the left of those from which the total has been transferred to the computing type wheels 51, are not operated by the computing wheels cooperating therewith during a total taking operation, because their carry-over levers are locked by the bar 469. Since the 0 types are normally at the printing line the 0 of each inactive computing wheel is printed to the left of the significant total while it is being printed. Thus if the total is 4256 it appears, when printed, as 000004256 since the accumulator has nine digit positions. A significant number preceded by one or more (zeros) indicates that it is a total.

After the total has been printed the accumulator is returned to its normal position, the computing wheels are returned to normal by the bail 59, the carriage 52 is returned to the right of the machine and the locking bar 469 is rendered inactive. The total key 68 is also released from the plate 320 by the cam 334 (Fig. 23). The key 68 is restored to normal by spring 491 (Fig. 23) engaging the head 492a of a pin 492 which is like the pin 336b associated with the subtraction key stem 310. The head 492a engages a projection 493 on the key stem 453 which in turn engages the plate 77 to arrest the total key 68 in its normal position.

Sub-total

The sub-total key 69 is provided with a key stem 494 guided in the plates 76 and 77 and has a projection 494a which normally engages under the plate 77. The key stem 494 is held in its normal position by a spring 495, located between the plate 76 and a head 496 of a pin 497 and the plate 76, said head engaging the projection 494a on the key stem 494 to hold the latter in normal position. The key stem 494 is similar to the total key stem 453 and is also provided with a pin 499 to engage a lip 500, similarly to that described in connection with the total key 68, to actuate the lever 458 to effect the release of the computer carriage 52 for the purpose of locating it in its extreme left position of the machine to register the computing wheels 51 with the dial wheel pinions 151 and to effect the locking of the carry-over levers 384 by the bar 469. The key stem 494 is also provided with a cam projection 501 to engage under the plate 320 to lock the sub-total key 69 in its operated position.

Setting of sub-total cam

During the depression of the sub-total key 69 the lower end of the stem 494 engages an arm 502 to rock the shaft 312 and shift, through the medium of the arm 315 and pin 316, the cam unit 70 rightwardly on the shaft 58 to a position (Fig. 38) in which the sub-total cam 276 registers with the cam follower 280.

By an inspection of Fig. 23 it will be seen that the arms 311 and 454, associated with the subtraction key 67 and the total key 68 respectively, normally stand slightly away from the lower ends of their respective key stems 310 and 453, and that the arm 502 is directly in contact with the bottom of the key stem 501 of the sub-total key 69. All of the keys 67, 68, and 69 have the same dip or extent of depression. Consequently the key 69, due to direct engagement of its stem 494 with the arm 502 in its normal position, rocks the shaft through a greater extent and therefore shifts the cam unit a greater extent rightwardly on the shaft 58, than that effected by the keys 67 and 68, to carry the sub-total cam 276 into register with the follower 280.

After the sub-total key 69 has been locked in its operated position the start key 55 may be operated to cycle the general operator shaft 59 to rotate the cam unit 70, including the sub-total cam 276 which, before its operation, is in the position indicated in Figs. 12 and 23, and has a receding or fall portion 503 similar to the fall portion 391 of the subtraction cam (Fig. 11).

The fall portion 503 of the sub-total cam 276 is active during the early part of the cycle of the general operator, see curve K (Fig. 49), and cooperates with the follower 280 to effect the actuation of the shaft 282 in a counterclockwise direction and consequently operate the accumulator 54 into engagement with the computing wheels 51 through the means including the arm 296 on the shaft 292 (Fig. 23). After the end of the fall portion 503 reaches the follower 280, a low dwell portion 504 of the sub-total cam 276 engages said follower. While the dwell portion 504 of the sub-total cam is active the bail 59 is operated forwardly out of holding relation with the computing wheels 51, thus permitting the latter to be operated by their springs 60 to rotate the dial wheels 216 until they are arrested in their 0 positions by the carry-over levers 384 which have previously been locked by the bar 469 upon the depression of the sub-total key 69.

When the sub-total has been subtracted from the accumulator 55 and transferred to the computing type wheels 51, the platen 166 is operated against the types 63, registered at the printing line to print the sub-total.

Thus far the sub-total operation is like the total taking operation. Instead of returning the accumulator to its normal position after printing, as in the case of total taking, it is held in engagement with the computing wheels 51 until the latter are returned to their normal positions, compare curves G and K (Fig. 49). This is accomplished by making the dwell 504 of such a length that the dial wheels 216 may be rotated in a counterclockwise direction by the computing wheels while the latter are being returned by the bail 59 to their normal positions. After this occurs an ascending or rise portion 505 of the cam 276 reaches the follower 280 and actuates the shaft 262 in a clockwise direction to rock the arm 296 and actuate the parts connected thereto to restore the accumulator to its normal position. It should be understood that, during the return movement of the computing wheels 51, the dial wheels 216 are again rotated in a positive direction to thus re-introduce the sub-total into the accumulator, after it has been printed, for use in further computation.

The carriage is then returned by (see curve I, Fig. 49) the general operator shaft 58 which, it will be remembered, operates the carriage return cam 204 through the medium of the beveled gears 376 and 377. As the general operator shaft 58 reaches the end of its cycle, the cam 334 thereon effects the operation of the locking plate 320 to release the sub-total key 66.

*Locking means between the group of numeral keys and the group of conditioning keys*

It will be remembered that the keys are divided into two groups, the group 47 of numeral keys and the group 66 of conditioning keys (Fig. 1). Provision is made to prevent the operation of the keys of either group while a key in the other group is in its operated position.

To prevent the operation of any one of the group 66 conditioning keys while a numeral key 48 is depressed, there is provided a pawl 508 (Fig. 16) which is located in the same plane as the slide 155 associated with the numeral keys and operable by any one of the stems 79 through the medium of its cam 159 (Fig. 5). The pawl is pivotally supported by a stud 509 on the upper end of a post 509a secured to the upper face of the plate 76. The pawl 508 has a head 510 which, during the forward movement of the slide 155 is engaged by a cam 511 on said slide to actuate the pawl 508 in a counterclockwise direction about its pivot. A nose 512 of said pawl is thus moved into the path of a shoulder 513 (Fig. 17) on the slide 320 (Fig. 17) associated with the group 66 of conditioning keys to prevent the forward movement of the slide 320 and thereby lock all of the keys of the group 66.

If, however, one of the group 66 of conditioning keys is operated while the slide 155 is in its normal position, the slide 320 is operated forwardly and a cam 514 on the slide 320 engages a head 515 on a pawl 516 to actuate the latter about a pivot stud 517 which is mounted on the plate 75 similarly to the stud 509. The pawl 516 is actuated in a clockwise direction to carry the nose 518 into the path of a shoulder 519 on the slide 155 (Fig. 18) to thereby lock said slide and consequently prevent the operation of any one of the numeral keys 48. The pawls 508 and 516 are provided with springs 520, 521, respectively, to return said pawls to their normal or inactive positions upon the return of their associated slides.

Any suitable means may be provided for restoring one of the conditioning keys 67, 68, 69 if it had been erroneously or inadvertently depressed. For example, the plate 320 may be extended to provide a finger piece 522 which will project upwardly through a slot in the casing (not shown), and the operator may thus draw the plate 320 forwardly to release the depressed key. An error in setting up the numeral keys is cleared by simply manually moving the carriage to the right, whereby the cam 64 will restore the set index pins to normal.

*Check writer*

It will be understood that some of the devices may be used without the others as, for example, the printing mechanism may be used to a good advantage without the computing mechanism in a check writer. In such a machine the wheels 51 serve merely as type wheels. The index pins 50 are set thereon in the same manner, by means including the numeral keys 48 and the setting devices 49. The carriage is fed by the escapement 53 to bring the type wheels 51 successively into register with the row of setting devices 49. After the number has indexed, the start key 55 may be operated, thus starting the motor 56 and connecting the general operator shaft 58 with the motor drive to cycle said shaft and effect the actuation of the bail 59 and thus permit the type wheels 51 to be operated by their springs 60 until they are arrested by their set index pins 50 engaging the stop bar 146, thus registering the types at the printing line. The platen 62 is then operated to print by the means including the cam 343 at the left end of the general operator 59. After printing, the platen is restored to its normal position, subsequent to which the bail 59 is restored to its normal position by the general operator shaft 58 to return the type wheels 51. The carriage is then returned to its normal position by means of the cam 204. While the carriage is being thus returned, the set index pins 50 are restored to their normal positions by the wiper cam 64.

The computing mechanism may also be used to a good advantage in some instances without the printing mechanism.

*Typewriter*

It should also be understood that the type wheels 51 may be constructed to have larger diameters so that each may include on its periphery, in addition to the numeral types, other type such as the letters of the alphabet and signs so that the machine may be used for typewriting.

Although the invention has been described by making a fully detailed reference to a certain presently preferred embodiment, such detail of description is to be understood in an instructive rather than a limiting sense, many changes being possible within the scope of the claims hereto appended.

We claim:

1. In a computing machine, the combination of a main frame, a carriage on said main frame and having end plates, means on the main frame to guide said carriage, a bail including a shaft supported at its ends on said main frame, said bail including two arms secured to said shaft, and a cross-bar supported by the free ends of said arms, an accumulator including a series of adjacent dial wheel units, a series of adjacent computing wheels, means to rotatably support the computing wheels on said carriage, said computing wheels being located between the carriage end plates, a set of index pins on each computing wheel, the index pins of each set having various numerical values, means to selectively set the pins, springs one for each computing wheel, said springs tending to rotate said computing wheels, means to effect a feeding movement of said carriage after the setting of an index pin on computing wheel, said computing wheels being held by the cross-bar of said bail against the action of their springs during the feeding movements of said carriage, means to actuate said bail after the index pins corresponding to the number to be computed have been set on the various computing wheels so that said computing wheels may be actuated by their springs, a bar on said carriage to be engaged by the set index pins to arrest the computing wheels in their operated position, an accumulator, means to cause the accumulator to cooperate with the computing wheels to transfer the numerical values set on the latter to the accumulator, means to return said bail to rotate the computing wheels back to normal through the medium of said cross-bar, and means to disengage the accumulator from the computing wheels.

2. In a computing machine, the combination of a main frame, a carriage on said main frame, a bail, a shaft on said main frame to support said bail, an accumulator including a series of adjacent dial wheels, a series of adjacent computing wheels, a carriage means to rotatably support said computing wheels on said carriage, a set of index pins on each computing wheel, means to selectively set said pins, springs, one for each computing wheel, said springs tending to rotate said computing wheels on said shaft, means to effect a feeding movement of said carriage after the setting of an index pin on each computing wheel, said computing wheels being held by said bail against the action of their springs during the feeding movements of said carriage, means to actuate said bail after the index pins corresponding to the number to be computed have been set on the various computing wheels so that said computing wheels may be actuated by their springs, means on said carriage to engage the set index pins to arrest the computing wheels in their operated position, means to cause the accumulator to engage the computing wheels, means to return said bail to rotate the computing wheels back to normal to add the numerical value set on the computing wheels to the accumulator, and means to disengage the accumulator from the computing wheels.

3. In a computing machine, the combination of an accumulator having dial wheels with numerals from 0 to 9 thereon, each dial wheel having a pinion thereon, computing wheels, a carriage to support the computing wheels, there being as many computing wheels as there are dial wheels, means to index digits of a number on successive computing wheels including settable pins, an escapement for said carriage, means to operate the escapement each time a digit is indexed, to effect the feed of the carriage and computing wheels into overlapping relation with the accumulator, means to actuate the accumulator to carry the dial wheels into and out of cooperative relation with the computing wheels, means to actuate the computing wheels to rotate the dial wheels in one direction to transfer the indexed number to said dial wheels, carry-over devices to assist in effecting carry-over operations device associated with each dial wheel, cooperative carry-over members, one on each dial wheel to actuate the associated carry-over device to initiate a carry-over operation, means to return the carriage to normal after the number has been transferred to the accumulator, means to restore the set pins to normal, means including a total key to subsequently release the carriage, means to arrest the carriage in a position to locate the computing wheels relatively to the dial wheels so that the computing wheel of lowest order registers with the dial wheel pinion of lowest order, means actuable by said key operated means to lock all of the carry-over devices against actuation by the carry-over members of the dial wheels, the actuating means being again caused to function after the computing wheels have again been brought into cooperative relation with the dial wheels, the computing wheels being effective at this time to rotate the active dial wheels in reverse directions until said cooperative carry-over members of the dial wheels engage the locked carry-over devices to thus restore the dial wheels to 0 and transferring the total registered by the accumulator to the computing wheels, means including types on the computing wheels to print the total, and means to subsequently return the carriage.

4. In a computing machine, the combination of an accumulator having dial wheels with numerals from 0 to 9 thereon, each dial wheel having a pinion, computing mechanism including a carriage having computing wheels thereon to actuate the dial wheels, the carriage and computing wheels being normally to one side of the accumulator, means to position the carriage so that the computing wheel of lowest order registers with the dial wheel pinion of lowest order, means to actuate the accumulator to carry the dial wheels into and out of cooperative relation with the aligned computing wheels, carry-over levers, one for each dial wheel, cooperative carry-over members, one on each dial wheel to actuate the associated carry-over lever when the dial wheel is operated in one direction, means to lock all of the carry-over devices against actuation by the carry-over members, means to actuate the computing wheels after they are in cooperative relation with the dial wheels to rotate the active dial wheels in a reverse direction until said cooperative carry-over members engage the associated carry-over levers to thus clear the accumulator and transfer the total registered on the accumulator to the computing wheels, means including types on the computing wheels to print the total, means to return the computing wheels, and means to return the carriage to its normal position.

5. In a computing machine, the combination of an accumulator having dial wheels with numerals from 0 to 9 thereon, pinions on the dial wheels, computing wheels, means including carry-over devices, one for each dial wheel, cooperative carry-over members, one on each dial wheel to actuate the associated carry-over device, a carriage for the computing wheels, means to urge the carriage in one direction, an escapement for said carriage, a total key, means operated by the total key to lock all of the carry-over devices against actuation by the carry-over members, means to release said carriage from the escapement, means to stop the carriage to locate the computing wheels in register with the dial wheel pinions, a general operator, means settable by the total key, the settable means being operable by the general operator to actuate the accumulator into engagement with the computing wheels while the latter are in their normal positions, means to actuate the computing wheels to rotate the active dial wheels until said cooperative carry-over members engage the associated carry-over devices to thus return the dial wheels to 0 and transfer the total registered on the accumulator to the computing wheels, types on the computing wheels to register the total at a printing line, a platen, means actuable by the general operator to cause the platen to cooperate with the registered types to print the total, means operable by the general operator to return the computing wheels to normal on the carriage, and carriage return means actuable by the general operator.

6. In a computing machine, the combination of a series of adjacent computing wheels, a set of index pins projecting radially from each computing wheel, said index pins having various numerical values, key actuated means to selectively set said index pins, springs one for each computing wheel, said springs tending to rotate their respective computing wheel, means common to all of the computing wheels to normally hold them against the action of said springs, means to actuate the common means to thus permit the actuation of the computer wheels by their springs each through an angular distance equal in value to its set index pin, a stop to be engaged by the set index pins to arrest the computing wheels in their operated positions, means to effect return of the common means to normal to thereby return the computing wheels to normal, an accumulator, means to cause the accumulator to cooperate with the computing wheels to transfer values equal to those of the set index pins thereon to the accumulator, said last means comprising a movable carriage to support the computing wheels, means operable to effect transverse movement of the carriage to move the computer wheels into alignment fore and aft of the machine relative to said accumulator, and means to move the accumulator into and out of cooperative engagement with said computing wheels.

7. In a computing machine, the combination of a series of adjacent computing wheels, a set of radially projecting index pins on each computing wheel, said index pins having various numerical values, key operated means to selectively set said index pins, springs one for each computing wheel, said springs tending to rotate said computing wheels in one direction, means common to all of the computing wheels to normally hold them against the action of said springs, means to actuate the common means to thus permit the actuation of the computing wheels by their springs each through an angular distance equal in value to its set index pin, a stop to be engaged by the set index pins to arrest the computing wheels in their operated positions, means to effect return of the common means to normal to thereby return the computing wheels to normal, an accumulator, means to actuate the accumulator to cause it to cooperate with the computing wheels after they have been actuated by their springs and prior to their return movements, to add the values equal to the set index pins thereon to the accumulator, means to move the accumulator out of cooperation with the computing wheels after they are returned to normal, a transversely movable carriage to support the computing wheels, said computing wheels being normally out of cooperation alignment with the accumulator and an escapement for the carriage operable to effect movement of the carriage and computing wheels into overlapping relation relative to said accumulator.

ROBERT S. WALLACH.
TORKEL E. TORKELSON.

References Cited in the file of this patent

UNITED STATES PATENTS

| Number | Name | Date |
|---|---|---|
| 650,066 | Kuttner | May 22, 1900 |
| 785,097 | Hamilton | Mar. 21, 1905 |
| 829,357 | Stroh | Aug. 21, 1906 |
| 829,769 | Ersland | Aug. 28, 1906 |
| 987,766 | Spiro | Mar. 28, 1911 |
| 1,004,877 | Hoch | Oct. 3, 1911 |
| 1,141,348 | Landsiedel | June 1, 1915 |
| 1,153,129 | McCaleb | Sept. 7, 1915 |
| 1,153,820 | Patten | Sept. 14, 1915 |
| 1,190,416 | Jacobs | July 11, 1916 |
| 1,214,886 | Brown | Feb. 6, 1917 |
| 1,231,999 | Burdick | July 3, 1917 |
| 1,265,440 | Fabian | May 7, 1918 |
| 1,288,259 | Stickney | Dec. 17, 1918 |
| 1,318,798 | Quentell | Oct. 14, 1919 |
| 1,324,460 | Martineau | Dec. 9, 1919 |
| 1,349,386 | Pitman | Aug. 10, 1920 |
| 1,371,138 | Bair | Mar. 8, 1921 |
| 1,526,931 | Rauchwetter | Feb. 17, 1925 |
| 1,562,120 | Nemcovsky | Nov. 17, 1925 |
| 1,592,568 | Orth | July 13, 1926 |
| 1,738,144 | Horton | Dec. 3, 1929 |
| 1,812,129 | Barrett | June 30, 1931 |
| 1,859,897 | Sundstrand | May 24, 1932 |
| 1,990,350 | Schump | Feb. 5, 1935 |
| 2,014,561 | Dysart | Sept. 17, 1935 |
| 2,034,345 | Kottmann | Mar. 17, 1936 |
| 2,152,320 | Llorens | Mar. 28, 1939 |
| 2,203,533 | Landsiedel | June 4, 1940 |
| 2,204,239 | Swanson | June 11, 1940 |
| 2,221,861 | Butler | Nov. 19, 1940 |
| 2,305,839 | Berrendorf et al. | Dec. 22, 1942 |
| 2,307,245 | Sundstrand | Jan. 5, 1943 |
| 2,312,797 | Carlstrom | Mar. 2, 1943 |
| 2,333,234 | Boyden et al. | Nov. 2, 1943 |
| 2,514,754 | Gang | July 11, 1950 |

FOREIGN PATENTS

| Number | Country | Date |
|---|---|---|
| 469,034 | Great Britain | July 16, 1937 |
| 515,627 | Germany | Jan. 12, 1931 |